US006993524B1

(12) United States Patent
Watanabe et al.

(10) Patent No.: US 6,993,524 B1
(45) Date of Patent: Jan. 31, 2006

(54) NETWORK-ATTACHED DISK UNIT WITH DATA PROTECTION FUNCTION AND SERVER PROTECTING DATA STORED IN NETWORK-ATTACHED DISK DEVICE

(75) Inventors: Naoki Watanabe, Sunnyvale, CA (US); Yoshifumi Takamoto, Kokubunji (JP); Hiroaki Odawara, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 09/599,735

(22) Filed: Jun. 23, 2000

(30) Foreign Application Priority Data

Jun. 25, 1999 (JP) .......................................... 11-179620

(51) Int. Cl.
G06F 17/30 (2006.01)

(52) U.S. Cl. ................................. 707/9; 707/8; 707/10; 709/229; 711/100

(58) Field of Classification Search .................. 707/8, 707/100, 103 R, 10, 4, 9; 709/229, 208, 231; 711/100, 214; 710/315, 6, 107; 714/15; 712/209; 700/121

See application file for complete search history.

(56) References Cited

U.S. PATENT DOCUMENTS

| | | | | |
|---|---|---|---|---|
| 5,862,403 A | * | 1/1999 | Kanai et al. .................... 710/6 |
| 5,911,143 A | * | 6/1999 | Deinhart et al. ........ 707/103 R |
| 5,941,969 A | * | 8/1999 | Ram et al. ................... 710/315 |
| 6,052,688 A | * | 4/2000 | Thorsen ....................... 707/100 |
| 6,058,394 A | * | 5/2000 | Bakow et al. ................. 707/10 |
| 6,226,745 B1 | * | 5/2001 | Wiederhold ................. 713/200 |
| 6,292,879 B1 | * | 9/2001 | Fong ........................... 711/214 |
| 6,363,499 B1 | * | 3/2002 | Delo et al. .................... 714/15 |
| 6,487,552 B1 | * | 11/2002 | Lei et al. ....................... 707/4 |

FOREIGN PATENT DOCUMENTS

CA   WO 0/056028 A * 3/2000

OTHER PUBLICATIONS

Erik Riedel, Garth Gibson, "Active Disks—Remote Execution for Network–Attached Storage", Dec. 1997, School of Computer Science, Carnegie Mellon Unibersity, Pittsburgh PA 15213–3890, CMU–CS–97–198.*

E. Riedel et al, "Active Storage for Large–scale Data Mining and Multimedia" Electrical and Computer Engineering, Proceedings of the $24^{th}$ VLDB Conference, New York, USA 1998, pp. 62–73.

G. Gibson, et al, "File Server Scaling with Network–Attached Secure Disks", Department of Electrical Computer Engineering, Proceedings, Special Issue vol. 25, No. 1, Jun. 1997, pp. 272–284.

* cited by examiner

*Primary Examiner*—Jean M. Corrielus
*Assistant Examiner*—Gwen Liang
(74) *Attorney, Agent, or Firm*—Mattingly, Stanger, Malur & Brundidge, P.C.

(57) ABSTRACT

Client 101 sends a function to be executed to server 102, and at the same time, sends information such as the send destination disk unit, function name, version, etc. The server stores the received function, uses the received information to create function information 127, creates function information 126 that contains access area list 124 to be sent to disk unit 103, and then sends the function and function information 126 to the disk unit. The disk unit stores the function and function information. When a function execution request is sent from the client to the server, if the server is also sent parameters, it creates additional function information 126 and sends said function information 126 together with the function execution request to the disk unit. The disk unit performs the function execution and restricts accesses during execution according to function information 126.

16 Claims, 25 Drawing Sheets

FIG. 3

FUNCTION INFORMATION 127

| | |
|---|---|
| ID | 301 |
| NAME | 302 |
| FILE SYSTEM ATTRIBUTION | 303 |
| OFFLOADED DISK UNIT | 304 |
| VERSION | 305 |
| SIZE | 306 |
| EXECUTION LEVEL | 307 |
| OBJECT 0 | 308 |
| OBJECT 1 | 308 |
| ⋮ | |
| OBJECT n-1 | 308 |

FIG. 6
FUNCTION INFORMATION 126

| ID | 01 | 601 |
| --- | --- | --- |
| NAME | FUNCTION 01 | 602 |
| POINTER | 0x0000f000 | 603 |
| SIZE | 0x00000100 | 604 |
| EXECUTION LEVEL | PRIORITY 1 | 605 |
| VERSION | 1.006 | 606 |
| NEXT POINTER | HEAD OF FUNCTION 00 | 607 |
| ACCESS AREA LIST INFORMATION | POINTER | 0x0000 1000 | 608 |
| | SIZE | 0x0000 0010 | 609 |
| | NUMBER | n | 610 |

FIG. 7
ACCESS AREA LIST 124

| ACCESS AREA 0 | HEAD | 0x0000 0500 | 701 |
| --- | --- | --- | --- |
| | SIZE | 0x0000 0200 | 702 |
| | ATTRIBUTE | r — — | 703 |
| ACCESS AREA 1 | HEAD | 0x0000 0300 | 701 |
| | SIZE | 0x0000 0051 | 702 |
| | ATTRIBUTE | r w — | 703 |
| ⋮ | ⋮ | ⋮ | |
| ACCESS AREA n−1 | HEAD | 0x0000 1100 | 701 |
| | SIZE | 0x0000 0020 | 702 |
| | ATTRIBUTE | r w x | 703 |

FUNCTION SEND PROCEDURE

FIG. 12 FUNCTION SERVER

FIG. 14 FUNCTION EXECUTION

FIG. 20

126 FUNCTION INFORMATION

| ID | 01 | | 601 |
|---|---|---|---|
| NAME | FUNCTION 01 | | 602 |
| POINTER | 0x0000f000 | | 603 |
| SIZE | 0x00000100 | | 604 |
| EXECUTION LEVEL | PRIORITY 1 | | 605 |
| VERSION | 1.006 | | 606 |
| ROLL BACK FLAG | ROLL BACK ON | | 2001 |
| NEXT POINTER | HEAD OF FUNCTION 00 | | 607 |
| ACCESS AREA LIST INFORMATION | POINTER | 0x0000 1000 | 608 |
| | SIZE | 0x0000 0010 | 609 |
| | NUMBER | n | 610 |

FIG. 21 FUNCTION EXECUTION

NETWORK-ATTACHED DISK UNIT WITH DATA PROTECTION FUNCTION AND SERVER PROTECTING DATA STORED IN NETWORK-ATTACHED DISK DEVICE

BACKGROUND OF THE INVENTION

The present invention relates to a network-attached disk unit, and especially to a disk unit and related server unit that enable data protection when a function is offloaded to said disk drive and then executed.

Due to the improvements in technology which have resulted in a higher integration of an LSI, a disk unit can also be provided with a higher performance processor and higher functional control LSI ICs than before. Thus, a network-attached disk unit is proposed to raise the throughput of the total system by providing a disk unit with a network I/F so that direct access is possible not only from the server, but also from the client.

NASD (Network-Attached Secure Disks) have been proposed by Garth A. Gibson, et al, of CMU (Carnegie Mellon University). The details are described in the "File Server Scaling with Network-Attached Secure Disks" of the ACM International Conference on Measurement and Modeling of Computer Systems (Sigmetrics '97), Seattle, Wash., Jun. 15–18, 1997. Further, an intelligent disk unit that increases system throughput by reducing the load of a server by offloading the processing being performed by a server to a disk unit has been proposed. That is, active disks have been proposed by Erik Riedel, Garth Gibson, et al, of CMU.

Details of active disks are described in the conference paper "Active Storage For Large-Scale Data Mining and Multimedia," in the Proc. of the 24th International Conference on Very Large Databases (VLDB '98), New York, N.Y., Aug. 24–27, 1998.

SUMMARY OF THE INVENTION

When executing a function that has been offloaded to a network-attached disk unit, control of the execution right and data access right during execution is difficult. Here, the term function refers to a process that is executable on the disk unit by freeing up processing being performed on the server, such as a selection or extraction process corresponding to a request from a client in the database, a direct data transfer between the client and disk units without passing through the server, the duplication of data among disk units, a data conversion such as from ECU to JIS and vice versa, etc.

It is possible to adopt management in accordance with an existing remote procedure used with a RPC (Remote Procedure Call) such as used with UNIX (UNIX is a registered trademark in the United States and other countries exclusively licensed through X/Open Company, Ltd.), however, since the OS and vendors are limited, compatibility with other operating systems, such as Linux (Linux is a registered trademark or a trademark of Mr. Linus Torvalds in the United States and other countries), is difficult. At present, the Unix RPC (Remote Procedure Call) is the closest in form, but if the RPC is applied, the server will have to acquire the file access right whenever a file is to be opened. This consumes a large amount of processor power and system resources such as memory, and has a poor cost/performance ratio.

The disk unit, containing files stored in the disk unit and user information related to the files, can manage. However, problems such as synchronization of the management information make it difficult to realize such management simply. The purpose of the present invention is to enable the effective restriction of data accesses by acknowledging access restriction when function execution is requested for the disk unit. Other purposes of the present invention are to enable compatibility with various types of operating systems and to enable data access restriction in which the application of restriction information is also easy.

To achieve the aforementioned goals, the present invention provides a disk unit connected to server and client units via a network and storage media to store data and a control unit. Said control unit is provided with a means to control input and output with respect to the aforementioned storage media, a means to store in memory received functions and function information related to said functions that were transmitted from the aforementioned server, a means to execute said functions corresponding to an execution request for the aforementioned functions from the aforementioned server, and a restriction means to restrict access, based on the aforementioned function information, of the data stored in the aforementioned storage media during execution of said functions.

The aforementioned function information contains a list that indicates the accessible area. The aforementioned restriction means restricts access based on said list. Each item of the aforementioned list contains attributes such as read, write, and executable, related to access restriction during function execution.

The aforementioned control unit is provided with a means for abnormal termination of the execution of the aforementioned function in case an access occurs in violation of the aforementioned access restriction. In addition, the aforementioned control unit is provided with a means to monitor whether execution of the aforementioned function was completed successfully, and in case execution of the aforementioned function was not completed successfully, a means to restore data saved in the aforementioned storage media to its state prior to execution of the aforementioned function.

In addition, the aforementioned control unit is provided with a means to monitor whether execution of the aforementioned function was completed successfully; in case execution of the aforementioned function was not completed successfully, a means to set a user command in the aforementioned function information that indicates whether to restore data saved in the aforementioned storage media to its state prior to execution of the aforementioned function; and in case execution of the aforementioned function was not completed successfully and only when the user command to restore data saved in the aforementioned storage media to its state prior to execution of the aforementioned function has been set in said function information, a means to restore data saved in the aforementioned storage media to its state prior to execution of the aforementioned function.

In addition, until execution of the aforementioned function is complete, the aforementioned control unit does not overwrite non-updated data with data that has been updated by execution of the function. The aforementioned control unit stores data updated by execution of the aforementioned function in memory inside said control unit.

A server unit is connected via a network to a client unit and a disk unit. Said server unit is provided with a means to create function information, at each request of function execution, that restricts the access area for data stored in the storage media of the aforementioned disk unit, when a request to execute a function on the aforementioned disk unit is received from the aforementioned client, and a means to transmit said function information to the aforementioned disk unit.

In addition, said server unit receives at least the user ID from the aforementioned client unit and has a means to create the aforementioned function information by creating function information that restricts the aforementioned access area based on at least the received user ID information.

In addition, a disk unit is connected to the client unit via a network. Said disk unit is provided with storage media to store data and a control unit. Said control unit is provided with a means to receive function execute requests and user ID information from the client unit via a network, a means to create function information, at each request of function execution, to restrict the access area for data stored in the aforementioned storage media, based on said user ID information, and a means to restrict the access area based on said function information.

BRIEF DESCRIPTION OF THE DRAWINGS

FIG. 3 is a table indicating the function information of a server function.

FIG. 6 is a diagram indicating the function information of a function on the disk unit.

FIG. 7 is a diagram indicating the access area list for functions on the disk unit.

FIG. 20 is a diagram indicating the function information of a function on the disk unit.

DESCRIPTION OF THE PREFERRED EMBODIMENTS

Preferred Embodiment 1

Figure 1:
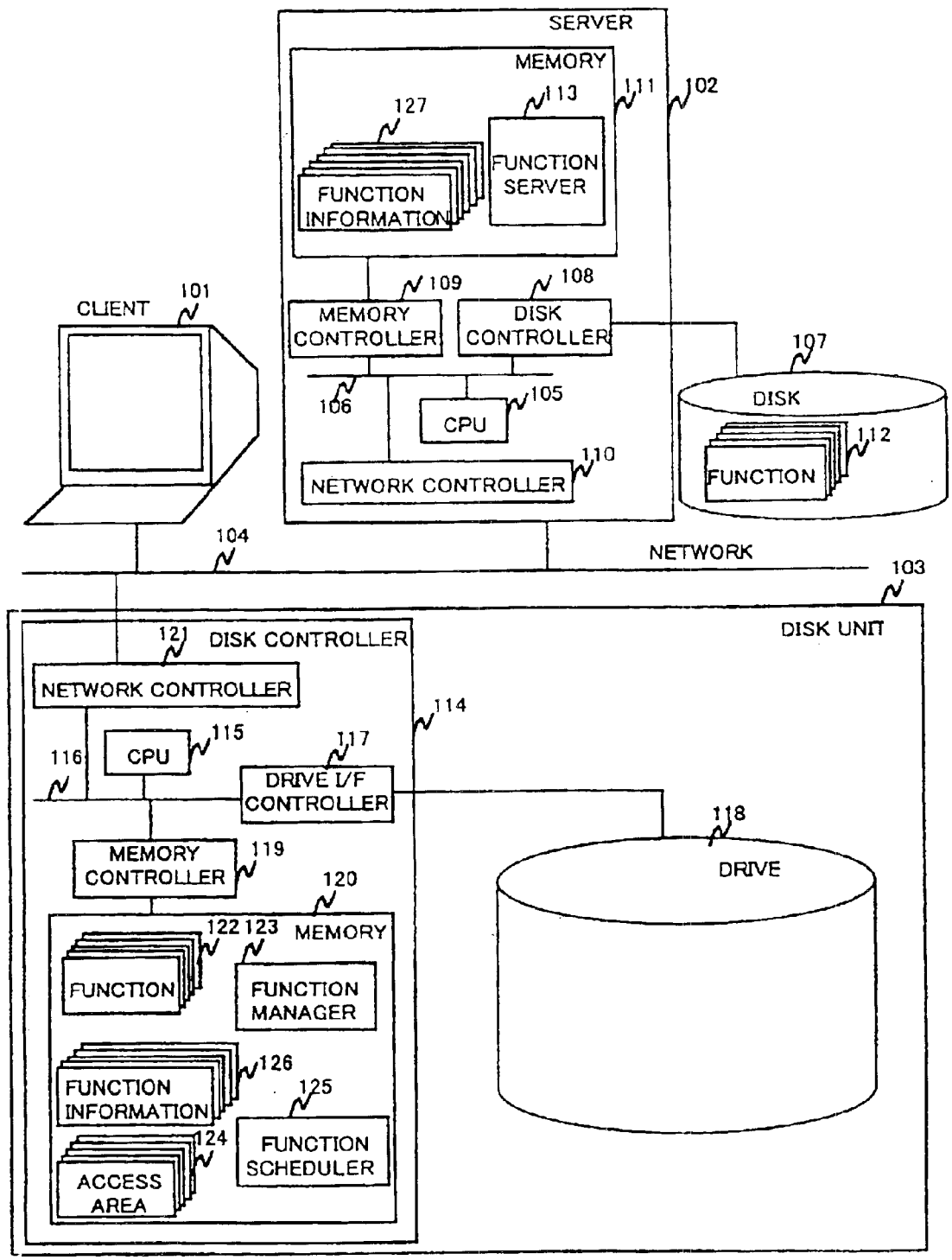
FIG. 1 is a block diagram illustrating the overall configuration of a preferred embodiment 1 of the present invention.

FIG. 1 indicates one preferred embodiment of the computer system related to the present invention. In the present preferred embodiment, disk drive 118 is indicated as being included in disk unit 103, however, a sub-system constructed from a plurality of disk drives 118 can also be configured as disk drive 103.

As indicated in FIG. 1, client 101, server 102 and disk unit 103 are interconnected by network 104 in the present preferred embodiment. In the present preferred embodiment, server 102 is provided separately, but, realization of the present embodiment is also possible with client 101 or disk unit 103 having the same functions as server 102 described in the present preferred embodiment. In other words, the function server to be described later may be installed on client 101 or disk unit 103.

Server 102 contains CPU 105 to execute the program. CPU 105 is connected to memory 111 via internal bus 106 and memory controller 109. The program to be executed by CPU 105 and the data necessary during execution are stored in memory 111. In the present preferred embodiment, function information 127 and function server 113 are stored in memory 111 and functions 112 are stored in disk unit 107. Except during execution, functions 112, function server 113 and function information 127 are stored in disk unit 107. As necessary, CPU 105 issues commands to disk controller 108 that is connected to internal bus 106, extracts them from disk unit 107 and uses them. Function information 127 retains control information related to each function 112. In the present preferred embodiment, data to be written to disk unit 107 and data read from disk unit 107 are stored in memory. Server 102 is connected to network 104 via network controller 110. CPU 105 controls network controller 110 via internal bus 106.

Disk unit 103 contains a disk controller 114 which includes CPU 115 to perform processing. Drive I/F controller 117 reads from drive 118 and stores in memory 120, according to the CPU command, the program to be executed by CPU 115 and the data used by the program. Memory controller 119 is connected to CPU 115 via internal bus 116 and controls accesses from CPU 115 to memory 120. Function manager 123, function scheduler 125, functions 122, access area lists 124 and function information 126 are stored in memory 120. Function information 126 stores information related to functions 122 and information of access area lists 124 that restrict the access area of functions 122. The data of disk unit 103 is stored in drive 118.

Drive 118 is controlled by the drive I/F controller 117 connected to CPU 115 via internal bus 116. By CPU 115 command, drive I/F controller 117 stores the data to be exchanged with drive 118 in memory 120. Disk unit 103 is connected to client 101 and server 102 with network 104. Network 104 is controlled by network controller 121 with CPU 115 command. The data to be exchanged via network 104 is stored in memory 120.

Figure 2:
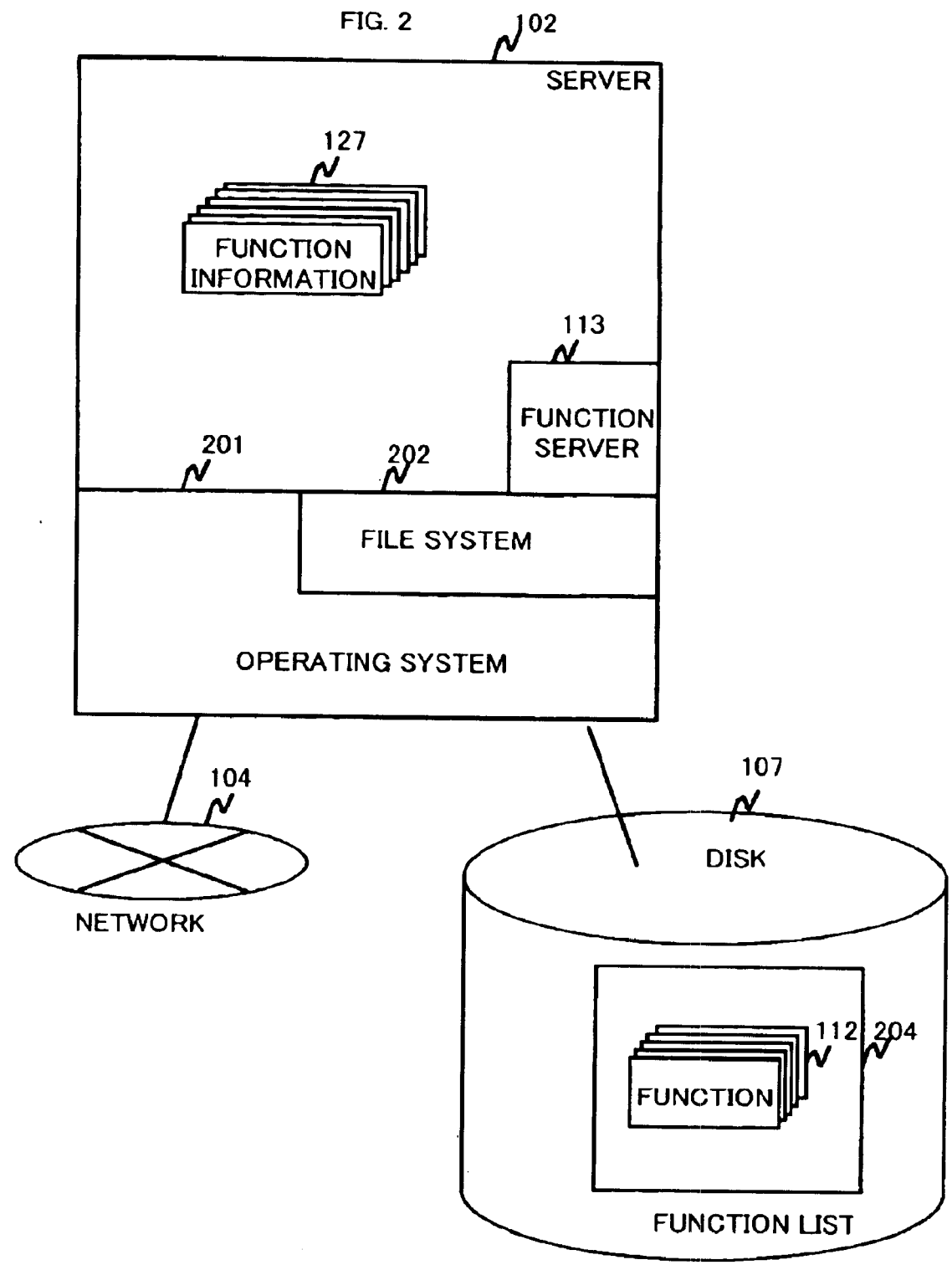
FIG. 2 is a diagram illustrating the server configuration.

FIG. 2 indicates one preferred embodiment of the program configuration of server 102 related to the present preferred embodiment. Server 102 contains file system 202 within operating system 201. Function server 113 is configured on operating system 201. Using function information 127, function server 113 manages functions 112 that are to be executed by disk unit 103. When necessary, function server 113 reads functions 112 from function list 204 of disk unit 107 into memory 111 on server 102. File system 202 manages the allocation of data stored in disk unit 107 and attributes such as user information.

FIG. 3 indicates one preferred embodiment of function information 127 related to the present preferred embodiment. Function information 127 is a table in server 102 that stores the management information of functions 112. This table is comprised of: management number ID 301; name 302; attribute 303 that indicates the function owner, execution right of the function and access right; offloaded disk unit 308 that indicates whether offloading of the function has already been completed; function version information 305; size 306 that indicates the size of the function; function execution level 307; and access object 0~n-1 308 that indicates the file accessed when a function is executed. Access object 0~n-1 308 indicates the file managed by file system 202 and includes the file name, size and attribute information. The aforementioned management information is basically set by the user when registering the functions. Access object 308 can also be set by the user when a function is executed.

Figure 4:
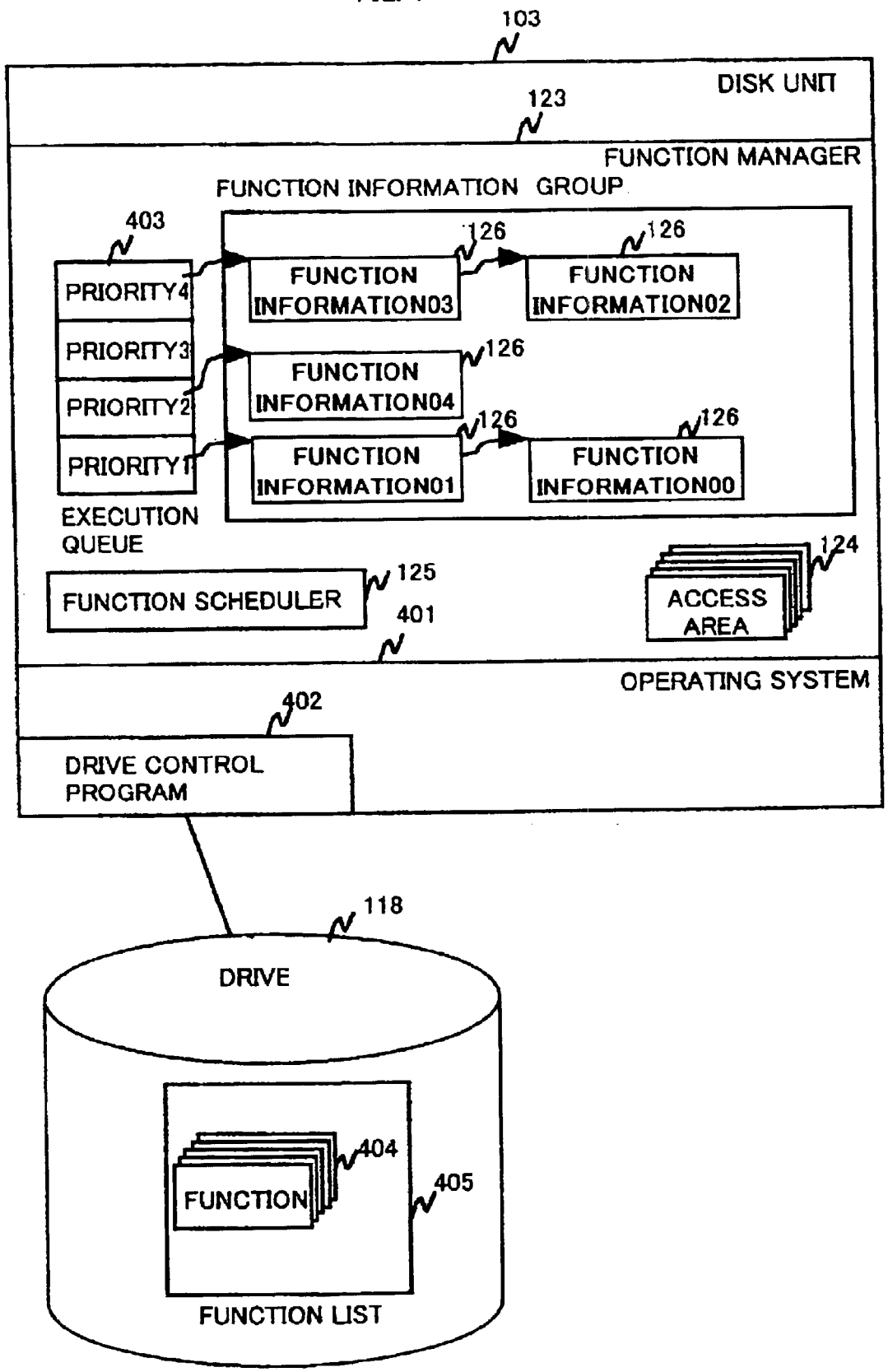
FIG. 4 is a block diagram illustrating the disk unit configuration.

FIG. 4 indicates one preferred embodiment of the program configuration for disk unit 103 related to the present preferred embodiment. Disk unit 103 controls drive 118 using drive control program 402 of operating system 401. Functions 404, sent from server 102, are stored in drive 118, and are read into memory 120 as necessary. Function manager 123 is configured on operating system 401. Function manager 123 contains function scheduler 125 that schedules functions 122 during execution. Function scheduler 125 manages each function 122 with execution queue 403. Execution queue 403 executes each function 122 according to the priority ranking of functions 122.

In the present preferred embodiment, functions 122 connected to priority 1 have the highest priority ranking, and the priority ranking decreases in order of priority 2, 3 and 4. Functions 122 to be executed are linked to execution queue 403 and functions 122 having the same priority are linked by a list. The group of function information 00, 01, 02, 03, 04 126 is management information for functions 122, and is called function information 126. Each function information 126 retains an access area list 124 indicating the accessible area.

Figure 5:
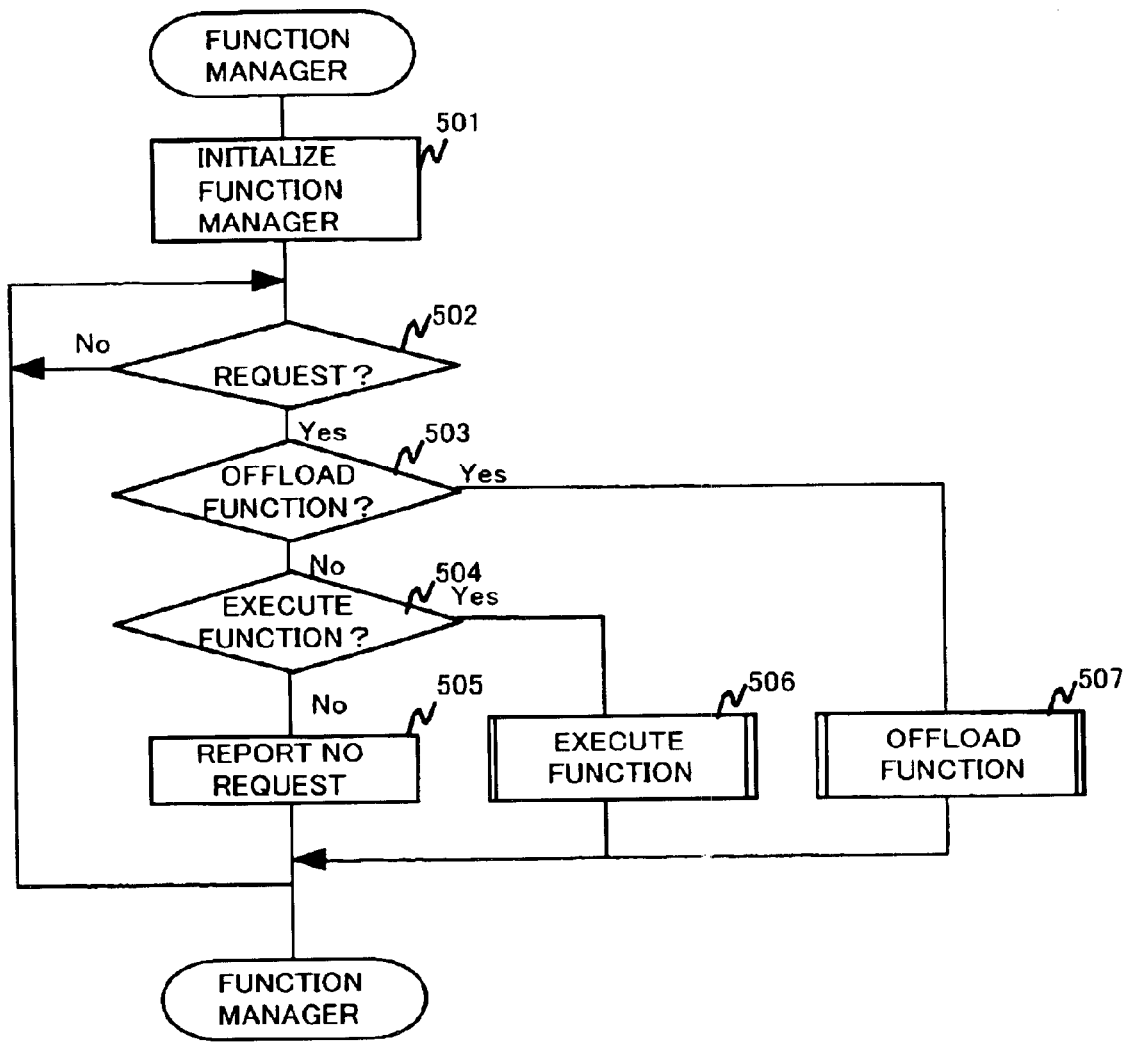
FIG. 5 is a flowchart indicating the function manager processing.

FIG. 5 is a flowchart indicating operation of function manager 123 on disk unit 103. After disk unit 103 is activated, function manager 123 is read from drive 118 into memory 120, and then is executed. First, function manager 123 initializes (501) execution queue 403, function information 126 and the area of access area list 124. Next, it waits for a request. When a request arrives, the type of request is analyzed (503). In the case of a function offload request, the function offload procedure (507) is executed, and in the case of a function execute request (504), the function is executed (506). In the case of a request other than the aforementioned two requests, a report (505) that the request is not appropriate is issued. This procedure is repeatedly executed.

FIG. 6 indicates one preferred embodiment of the management information for functions 122 in disk unit 103 related to the present preferred embodiment. Function information 126 of FIG. 6 is created by server 102 based on function information 127 and is sent along with a function execute request to disk unit 103. Function information 126 includes: management number ID 601, name 602, pointer 603 that indicates the function storage location on drive 118, size 604 that indicates the size of function 122, execution level 605 that indicates the priority when executed, version 606 that indicates the version of function 122, next pointer 607 that points to the next function when connected to execution queue 403 (in the figure, in accordance with FIG. 4, the head address of function 00 is listed), pointer 608 that indicates the location of access area list 124, size 609 that indicates the size of the list, and element number 610 in the list.

FIG. 7 indicates one preferred embodiment of access area list 124 related to the present preferred embodiment. Access area list 124 of FIG. 7 is created by server 102 based on function information 127 and is sent along with a function execute request to disk unit 103. More specifically, based on access object 308 of function information 127, the physical address and attributes (read (r), write (w), and executable (x)) of said access object 308 (directory or file) are obtained from file system 202, and access area list 124 is created.

Access area list 124 contains 1 or more items. Each item includes: head 701 that indicates the head address of the access area, size 702 that indicates the size, and attributes 703 that indicates the data attributes. There are 3 types of attributes: read (r), write (w), and executable (x). In the case of an executable attribute, the access object can be executed from memory as a program. A physical address is indicated in the present preferred embodiment, but the management ID of an object such as indicated by NASD, can also be used.

<Function Send>

Figure 8:
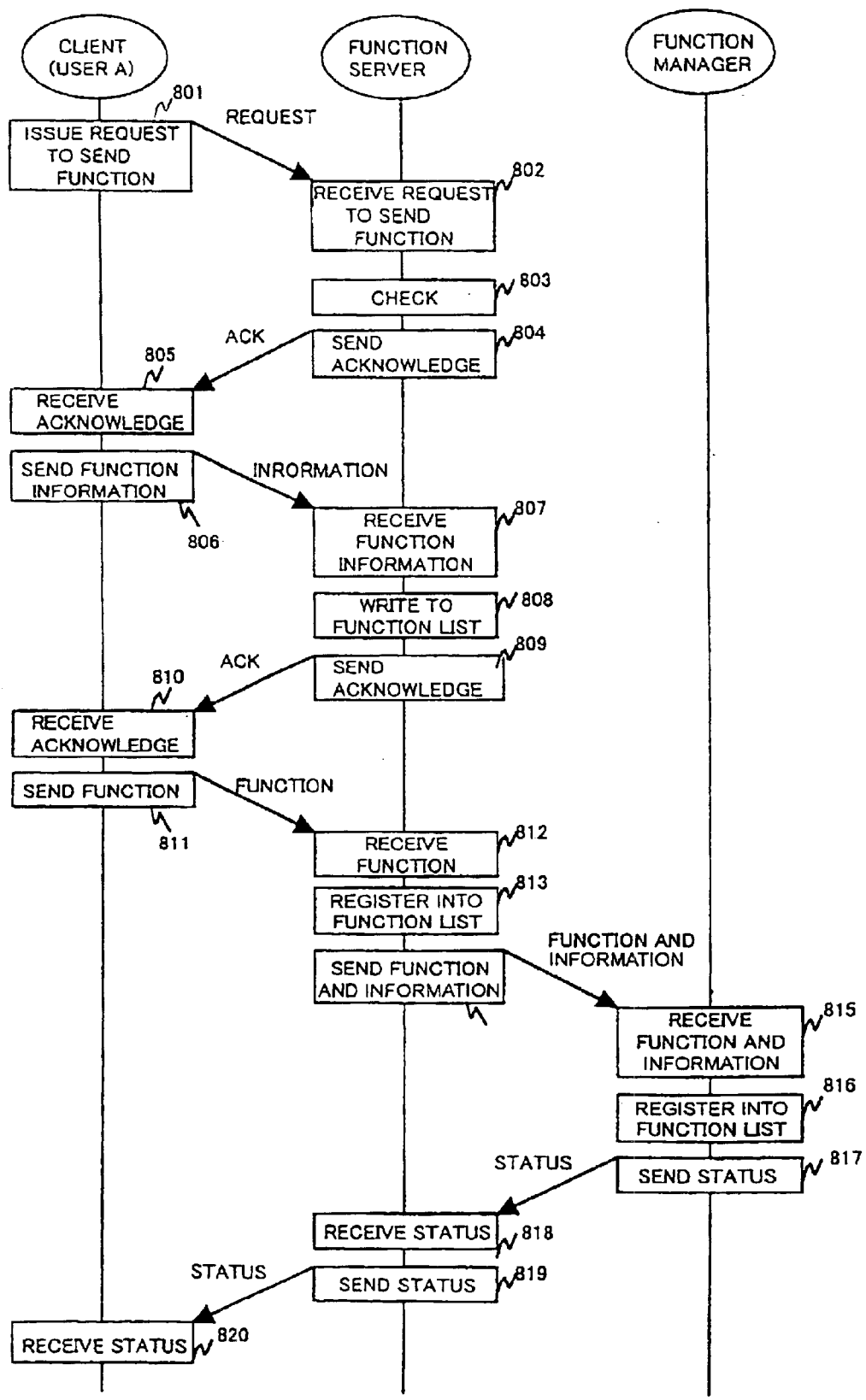
FIG. 8 is an operational flow diagram indicating the overall flow of the function send procedure during normal processing.

First, the function send procedure shall be described with reference to FIG. 8. FIG. 8 is an operational flow diagram indicating the exchange of information during a normal function send procedure. The present preferred embodiment indicates the procedure of sending a function from client 101, but function-sending origins different from client 101 can also be implemented.

At first, client 101 issues a function send request (801) to function server 113. At this time, user information of the sending origin is also sent to function server 113 during the request. Function server 113 receives a request (802), analyzes the request, checks the user's right, and inquires (803) as to whether the function can be sent to function manager 123 on disk unit 103 of the destination. If the function can be sent, client 101 is notified (804) that the function can be received.

If client 101 receives notice (805) that the function can be sent, information relating to the function is sent (806) first to server 102. Server 102 receives (807) the information. This information is used to create function information 127 on function server 113. After function server 113 creates function information 127 on the function server from information received from client 101, it creates (808) function information 126 to be sent to the client.

The function information 127 contains disk unit 103 that is the send destination, function name, size, execution level, access object, etc. Access objects specify files and directories. Function server 113 obtains the physical address on disk unit 103 and the attributes for the file used from the file system and operating system based on the information received from client 101, creates function information 126 and access area list 124, and sends them to the client. ID 601, name 602, execution level 605, and version 606 use values of function information 127 of function server 113. Pointer 603 and size 604 are a physical address on disk unit 103 where said function is stored and are obtained from file system 202. Access area list information stores information related to access area list 124.

After the creation of access area list 124, as indicated below, pointer 608 that indicates location information for access area list 124, size 609 that indicates the size of access area list 124, and element number 610 that indicates the number of elements in the access area list, are created based on information at that time.

The methods of creating access area list 124 will be described with reference to FIG. 9 and FIG. 10. In the figures, the resultant file data of the inquiries to the operating system and file system are indicated to be located at the positions of DATA0 and DATAn−1. As in the figures, if one file is fragmented (scattered in separate locations), there is the method of FIG. 9 in which each contiguous portion of DATA0 902 and DATAn−1 903 is individually specified to be access area 904 and access area 905 by information 906 and information 907 in the list, respectively. There is also the method of FIG. 10 in which information 1004 is specified in the list by access area 1003 that includes the head DATA0 1001 and the end DATAn−1 1002 of disk unit 103.

Figure 9:
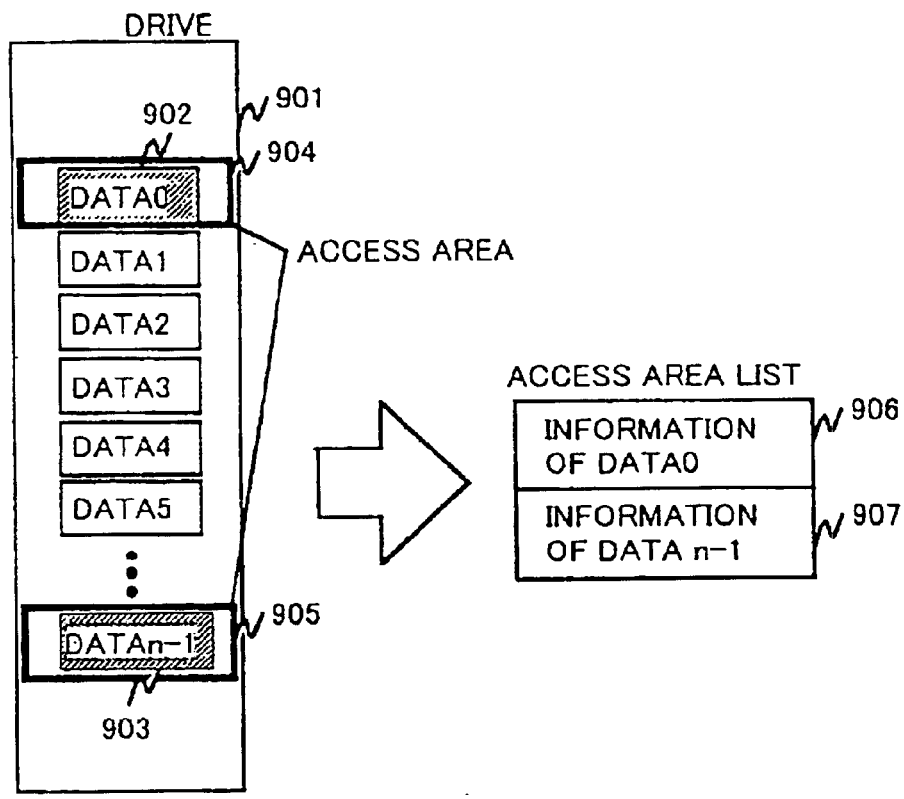
FIG. 9 is a diagram indicating an example of the access area specification method.
Figure 10:
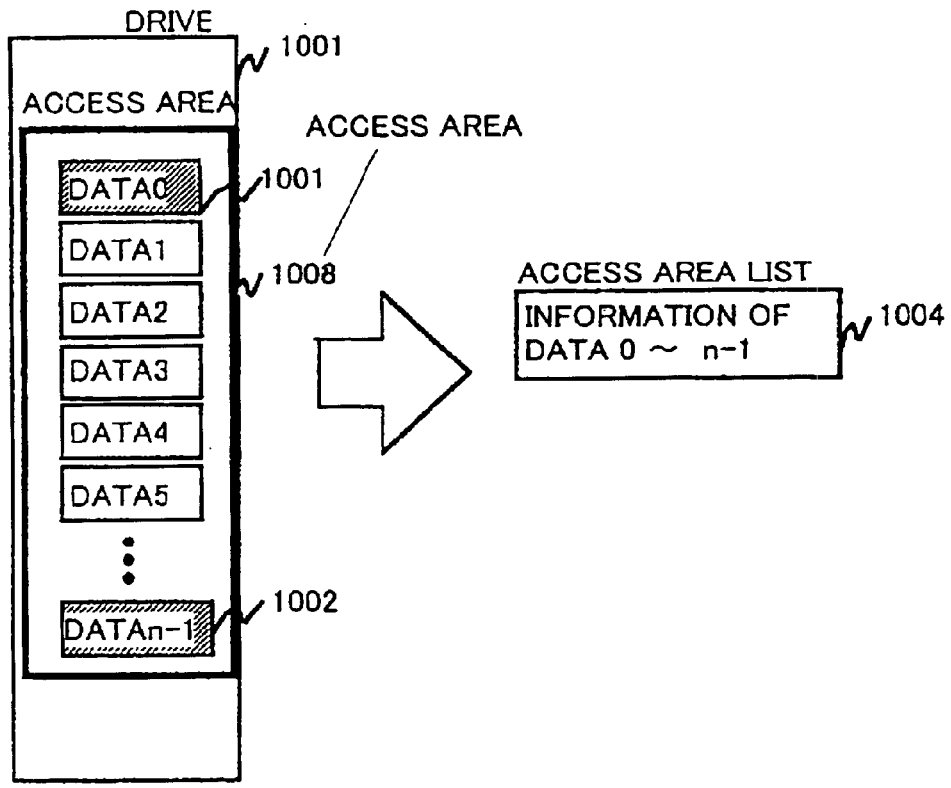
FIG. 10 is a diagram indicating an example of the access area specification method.

Because the settings of FIG. 9 are detailed, reliability is good but access area list 124 is large. Since FIG. 10 is set roughly, reliability is poor but the size of the access area list 124 becomes small. Which method is utilized will depend upon the system. If these methods are to be utilized, it is desired for the file system to consciously store files in contiguous areas.

After receiving information, function server 113 sends (809) a receive acknowledgment to client 101. Client 101 receives (810) the function information receive acknowledgment and then sends (811) the function to server 102. When function server 113 receives (812) a function from client 101, it stores said function in disk unit 103 and registers (813) the information into the function list on function server 113. Next, server 102 combines function information 126 with the access area list and the function, and sends (814) this combined information to disk unit 103 specified by client 101.

When disk unit 103 receives (815) this information from function server 113, it is registered (816) into the function list, and the send complete status and storage results are sent (817) to function server 113. Function server 113 receives (818) the results, and sends (819) the same results to client 101. Client 101 receives (820) these results.

Figure 11:
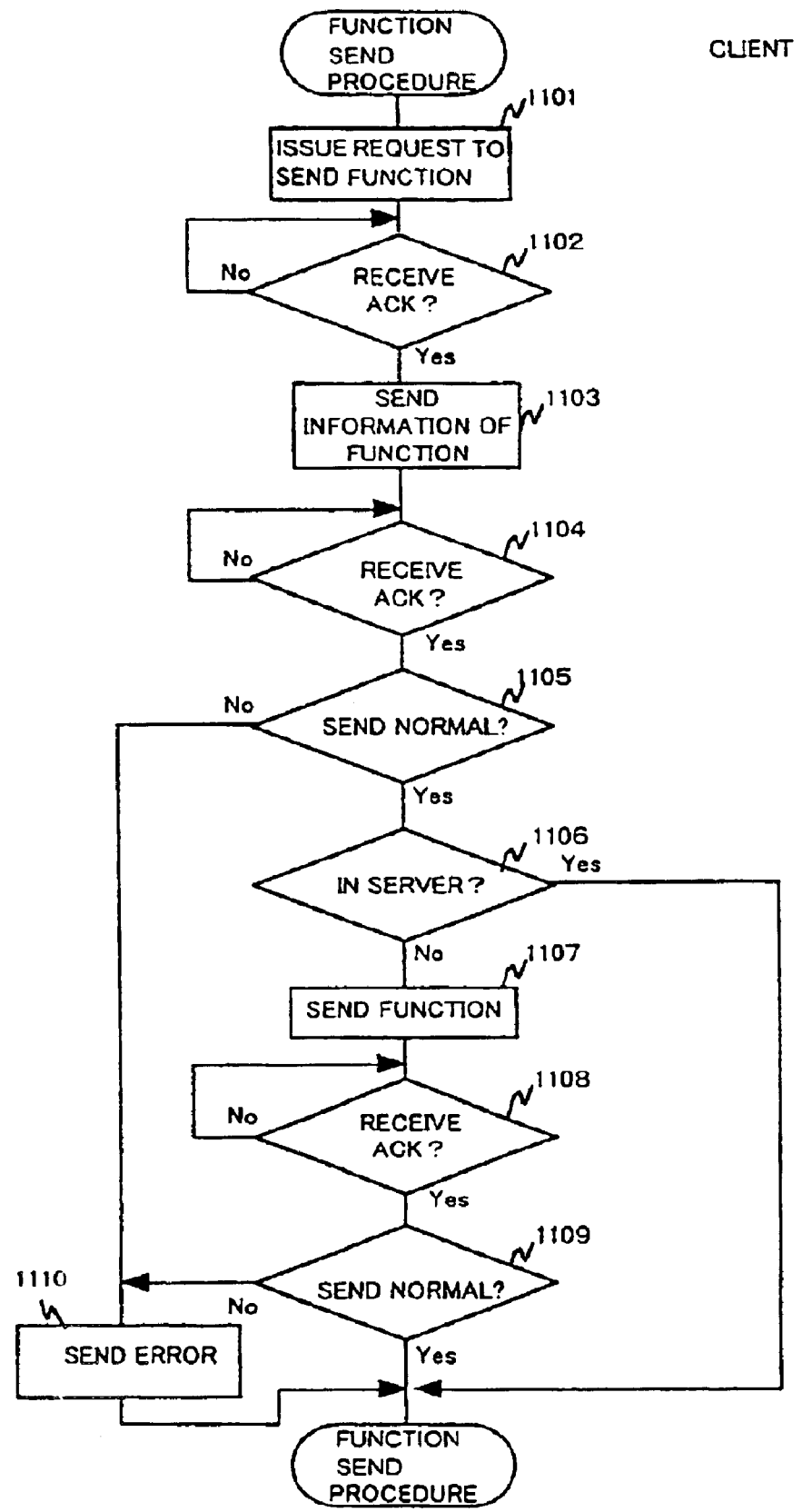
FIG. 11 is a flowchart indicating the function send procedure for the client.

Details of the operation of client 101 will be described using FIG. 11.

At first, client 101 sends (1101) the function send request to function server 113 that is issued by the user that operates client 101. A receive acknowledgment is received (1102) from function server 113. Next, send destination disk unit 103, function name, version, size, execution level, access object, etc., necessary when sending a function, are sent (1103) to function server 113. Next, a receive acknowledgment is received. If there is an error, since it is a function send error, error processing is performed (1110) and the procedure is finished. If the send is normal, processing continues.

The receive acknowledgment (1104, 1105) is analyzed. If the function is not on function server 113, the function is sent (1106 ~ 1109). If the function is already on function server 113, the client does not send the function and instead waits for an acknowledgment signal from server 102. After the function is sent normally to disk unit 103, if the sending of the function is accomplished without error, the procedure is complete as is. If there is an error, error processing is performed (1110) and the procedure is finished.

Figure 12:
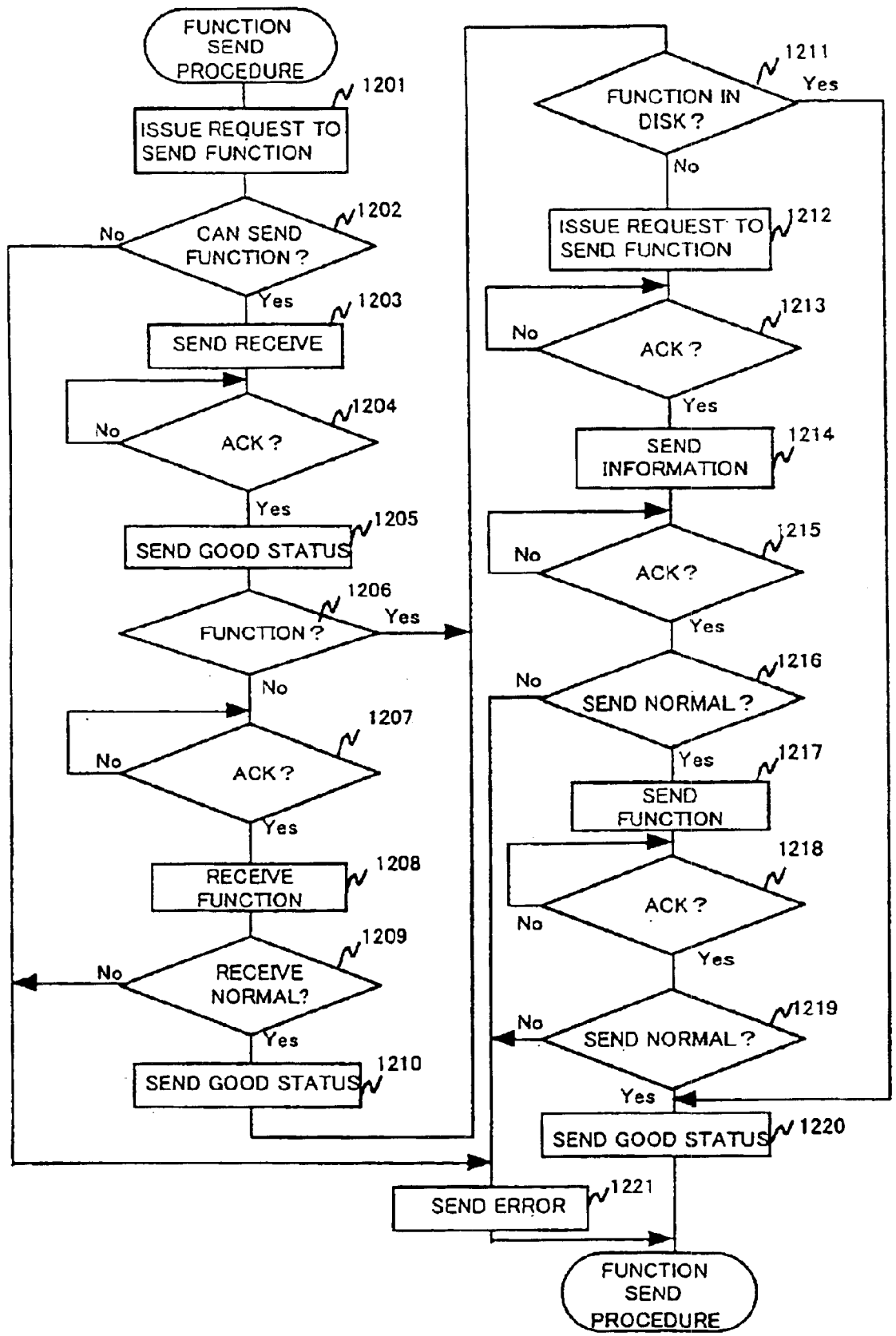
FIG. 12 is a flowchart indicating the function send procedure for the function server.

Details of the operation of function server 113 will be described using FIG. 12.

First, function server 113 receives (1201) a function send request issued from client 101. The function server checks (1202) whether the function can be sent. If the function can be sent, it sends (1203) a receive acknowledgment to client 101, and the procedure continues. If an error occurred, client 101 is notified that an error occurred, error processing is performed (1221), and the procedure is finished.

Next, function information 127 is received (1204, 1205). At this time, at first, the sent function information 127 is checked. If the same version of the relevant function is not already on function server 113, the function is received (1207~1210) from client 101. If the function is on the server, a procedure (1211~1220) to send the function to the disk unit is executed.

The procedure (1207~1210) for receiving a function from the client will be described. If said function is not on function server 113, the function is received (1207, 1208) from client 101. If the function has been received normally, a good reception acknowledgment is sent (1210) to client 101. If an error has occurred, the error is acknowledged (1221) and the procedure is finished.

Next, the received function is stored in memory. Next, the function is stored in disk unit 107. Function server 113 stores the function by using file system 202 on server 102. At this time, function server 113 determines the file name at once on the system. The function ID is also determined at once on the system.

With the user who sent this request from client 101 as the owner, the function server creates such attributes as who can execute, access and delete the function, and adding the name, version, size, execution level, and access object sent from client 101, creates function information 127 of said function. The created function is stored and saved in function list 204.

Next, the procedure for sending a function to function manager 123 of disk unit 103 will be described (1211~1220).

At first, it is examined (1211) whether the procedure of sending a function to disk unit 103 had been completed. If the send to disk unit 103 had been already completed, a send complete acknowledgment is sent to client 101 and the process is completed (1220). If the function has not been sent, a procedure to send the function to disk unit 103 is subsequently performed.

First, a function send request is issued (1212) to disk unit 103. Next, function information 126 and the function are sent from function server 113 to disk unit 103. Function information 126 retains information of access area list 124. At first, a function send request is issued (1212) and then function information 126 is sent (1214). Function server 113 sends (1214) function information 126 to function manager 123 of disk unit 103. If function information 126 has been sent normally, a function send (1217) is executed. If an error occurred while sending function information 126, the error is reported to client 101 and the processing is finished (1216, 1221).

After function information 126 is sent normally, function server 113 sends the function to function manager 123. If the function has been sent normally, a good send acknowledgment is sent (1220) to client 101. If the function send procedure was normal, said disk unit is registered in the send-completed disk unit 103 of function information 126, and then a good send complete acknowledgment is sent to client 101 and the procedure is completed. If an error has occurred during the function send procedure, at this time, the function and function information 126 on function server 113 retain their state prior to the send to disk unit 103.

Figure 13:
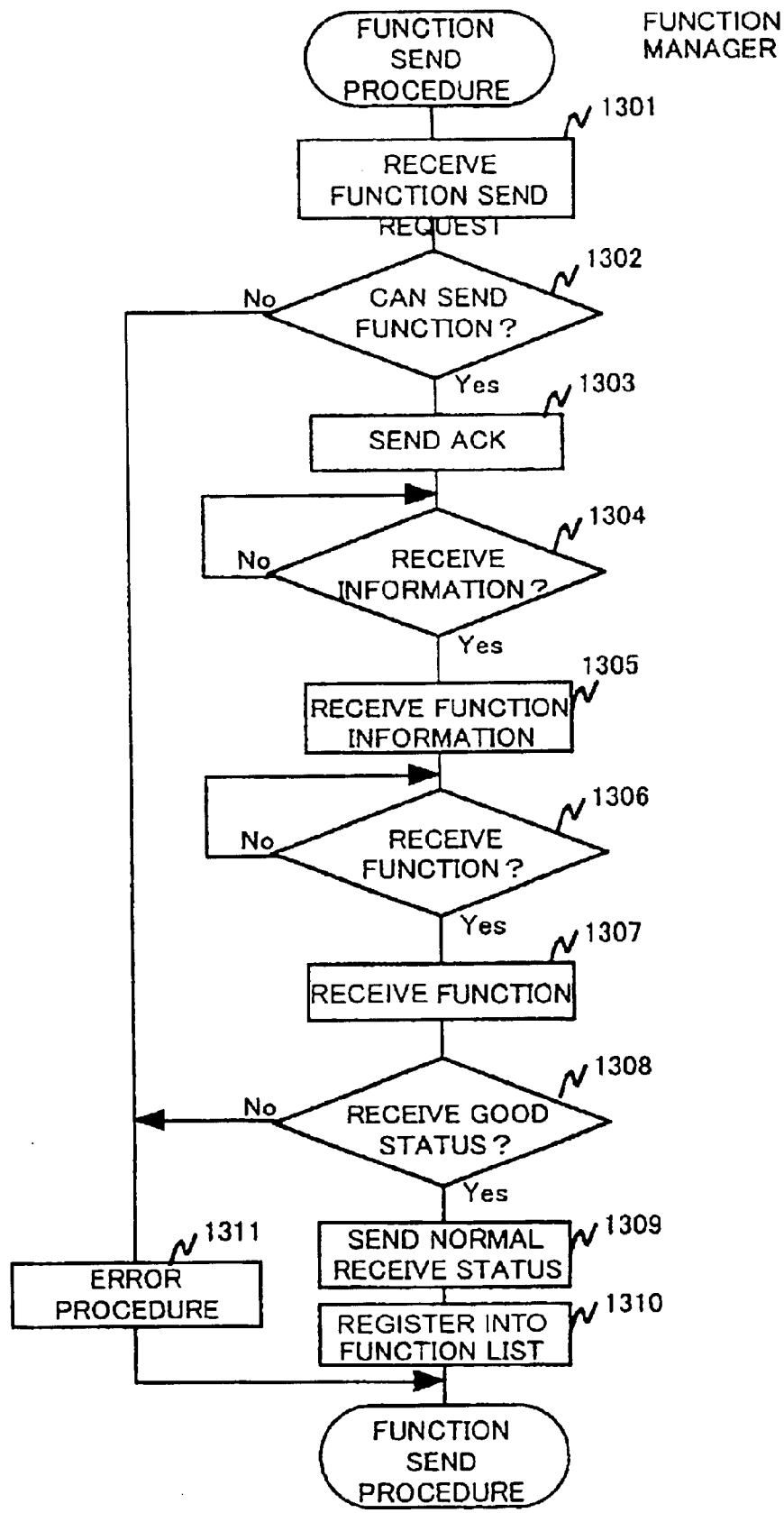
FIG. 13 is a flowchart indicating the function send procedure for the function manager.

Details of the operation of function manager 123 will be described using FIG. 13.

First, a function send request is sent (1301) from function server 113 to function manager 123. If function manager 123 cannot receive the function, a reception impossible acknowledgment is issued to function server 113 and the procedure is finished (1302, 1311). If the function can be received, a function reception possible acknowledgment is issued to function server 113 and then the procedure continues (1302, 1303).

Next, function manager 123 waits (1304) for function information 126 to be sent from function server 113. When function information 126 arrives (1305), function manager 123 converts the initially sent function information 126 into function information 126 of function manger 123 on disk unit 103.

Next, function manager 123 waits (1306) for the function to arrive from function server 113. When the function arrives, an area with the function size listed in function information 126 is reserved and the function is written (1307) to drive 118. At this time, the head address is added to function information 126. If the function is normally stored, function information 126 is stored in an arbitrary area of drive 118 and a good function reception acknowledgment is issued (1308, 1309) to function server 113. Finally, the function is registered (1310) into function list 405 and the procedure is completed.

<Function Executions>

Figure 14:
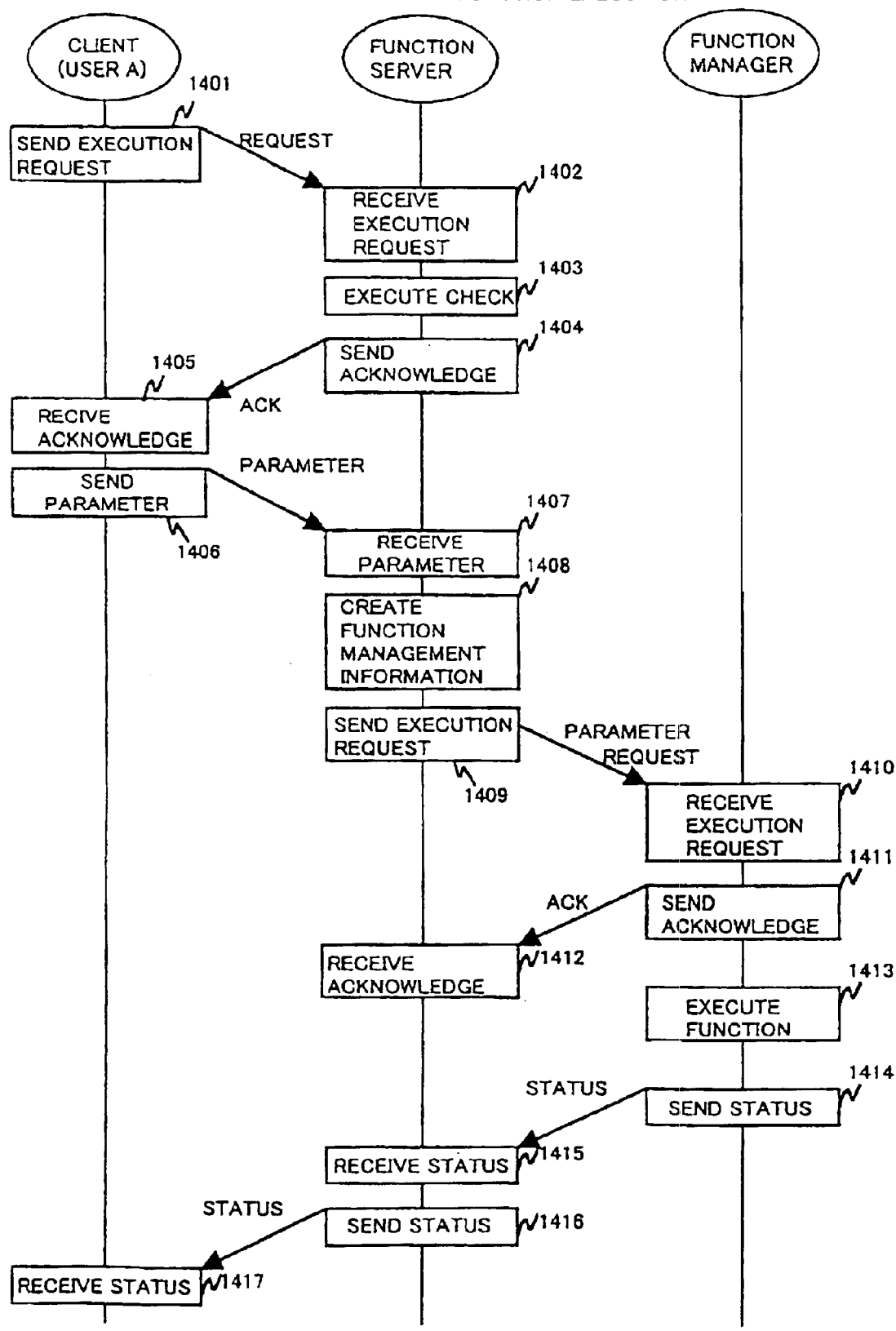
FIG. 14 is an operational flow diagram indicating the overall flow of the function execute procedure during normal processing.

The general flow of the function execute procedure will be described first using FIG. 14.

The user of client 101 notifies (1401) function server 113 of the function desired to be executed now and the disk unit 103 that will execute the function. When function server 113 receives (1402) a request from client 101, it analyzes the contents of the request and checks for the existence of the requesting user's right (1403). If the function is executable, it is acknowledged (1404).

When client 101 receives (1405) the acknowledgment, it sends (1406) the necessary parameters for function execution to function server 113. Here, the parameters are the name of the file to be used and the data that is necessary during function execution. Function server 113 receives (1407) the parameters, extracts the function information 126 related to said function from function list 204, and creates (1408) function information 126 and access area list 124 to be sent to function manager 123 of disk unit 103. At this time, the area has been already specified in access area list 124. If files and directories are further specified from client 101, areas are added to access area list 124. Function server 113 sends (1409) the created information along with the function execution request to function manager 123.

When function manager 123 receives (1410) the function execution request, it issues (1411) a function receive acknowledgment to function server 113. Next, function manager 123 executes (1413) the received function, and if the function execution is completed without errors, it sends (1414) notice that function execution is completed and the function execution results to server 113. Function server 113 receives (1415) said notice, and after analysis, sends (1416) notice that function execution is completed and the function execution results to client 101. Client 101 receives (1417) notice that the function execution is completed and the function execution results, reports to the user that execution is completed, and ends the procedure.

Figure 15:
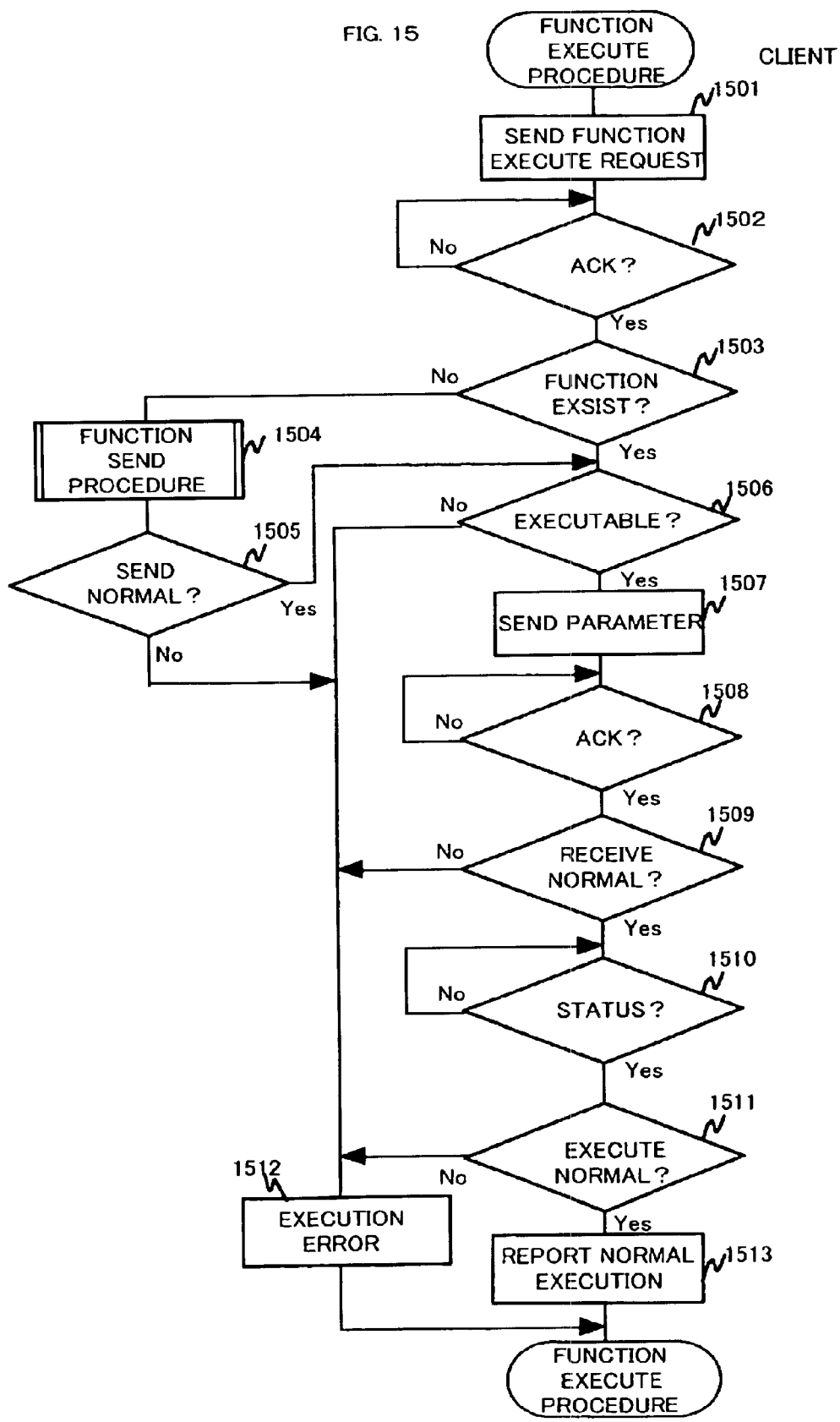
FIG. 15 is a flowchart indicating the function execute procedure for the client.

Next, the flow of a function execution request will be described using FIG. 15.

When a user of client 101 executes a certain function, at first, a function execute request is sent (1501) to function server 113. Along with the function execute request, disk unit 103 that will execute the function and the user is informed. Here, disk unit 103 has been chosen to execute the file. However, since disk unit 103 can be determined at once from a file of file system 202 on server 102, implementation is also possible by specifying a file of the file system on server 102.

After issuing the function execution request, client 101 receives (1502) a function receive acknowledgment from function server 113. If the function is not registered in the server, a function send is performed (1504). If the send is performed normally, the procedure continues. If an error occurs, an error notice is issued and the procedure is finished (1512).

Next, if the report contents are non-executable, because the function is non-executable, error processing is performed and the procedure is finished (1506, 1512). If the function is executable, then parameters necessary during function execution are sent (1507). Here, the parameters are the file and directory to be used and the data necessary during function execution. After the parameters are sent, the parameter receive results are received (1508). In case of an error, error processing is performed and the procedure is finished. If there is no error, the procedure continues.

The client waits (1510) for function execution completion. Client 101 receives (1511) the function complete acknowledgment and the function execution results. In the case of erroneous completion, error processing is performed, the user is notified that an error occurred, and the procedure is finished (1512). If the execution process was performed normally, the user is notified of the normal processing and of the function execution results, and the procedure is completed (1513).

Figure 16:
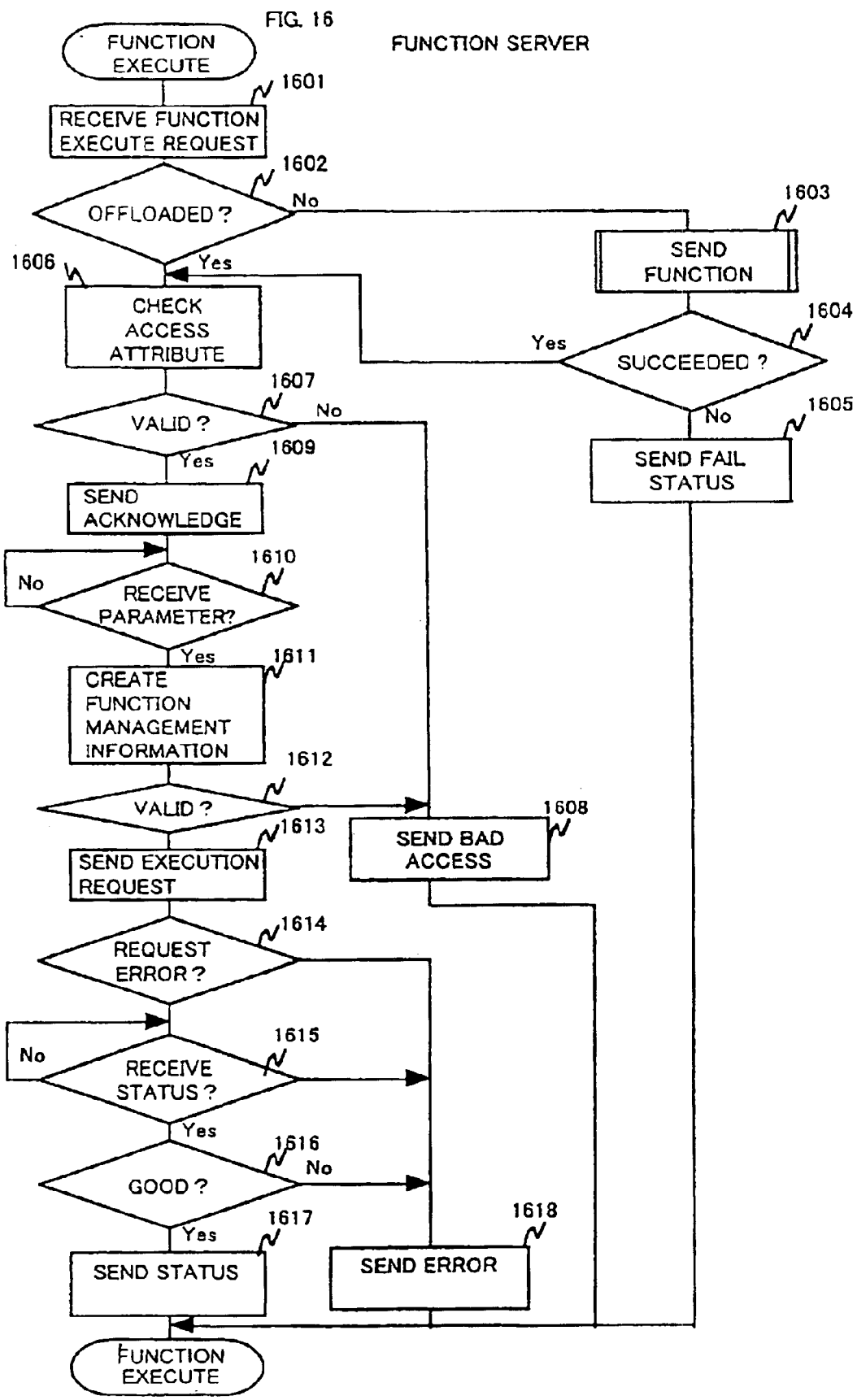
FIG. 16 is a flowchart indicating the function execute procedure for the function server.

Next, the procedure during function execution of function server 113 will be described using FIG. 16.

At first, function server 113 receives (1601) a function execute request from client 101. At this time, along with the request, client 101 specifies disk unit 103 that executes the function and the user that originated the request. Function server 113 searches function list 204 for the requested function. If the requested function is not in function list 204, or if after examining function information 126, said function has not been sent to said disk unit 103 (1602), the function in client 101 is sent (1603) to function manager 123 via function server 113. If the function send is completed normally, the procedure continues. If the function could not be sent (1604) normally, client 101 is notified (1605) that the function send has failed, and the procedure is finished.

When the function has been sent to disk unit 103, function information 126 of said function is extracted from function list 204, and whether the user making the request for said function has the function execution right is checked (1606). If the user has (1607) no function execution right, client 101 is informed (1608) that the user has no execution right, and the procedure is finished. If the user has (1607) function execution right, client 101 is informed (1609) that the function is executable.

Next, parameters necessary during function execution are received (1610) from client 101. Parameters related to the access area are added to the access object of function information 126.

Next, conversion of the access object is performed. Obtaining the physical address of a file or directory from file system 202 and operating system 201 on server 102, the access object gains the physical location of the file and creates access area list 124. At this time, whether the user who originated the request has the access right to the specified file and directory is checked (1612). If there is no access right, client 101 is notified of a process error and the procedure is finished (1608). If access is possible for all access objects, the procedure continues.

Next, along with the function execution request, function server 113 sends (1613) parameters other than the access area and access area list 124 to function manager 123. If the receive acknowledgment (1614) of the function execute request has an error, client 101 is notified (1618) of the error and the procedure is finished. If there is no error, the function server waits (1615) for a function execution complete acknowledgment.

After function execution is completed, and after function server 113 receives a function complete report from function manager 123, the contents of the report are examined (1616). If there is an error, client 101 is notified (1618) of the error and the procedure is finished. If the report is normal (1616), a good completion acknowledgment and the function execution results are sent (1617) to client 101 and the procedure is completed. If the function has not been sent to function manager 123 as indicated above, then prior to the function execution request for function manager 123, a function send procedure is performed according to the sequence of function send procedures. The function execute procedure will be described for the case when the function already has been sent to the function manager.

Figure 17:
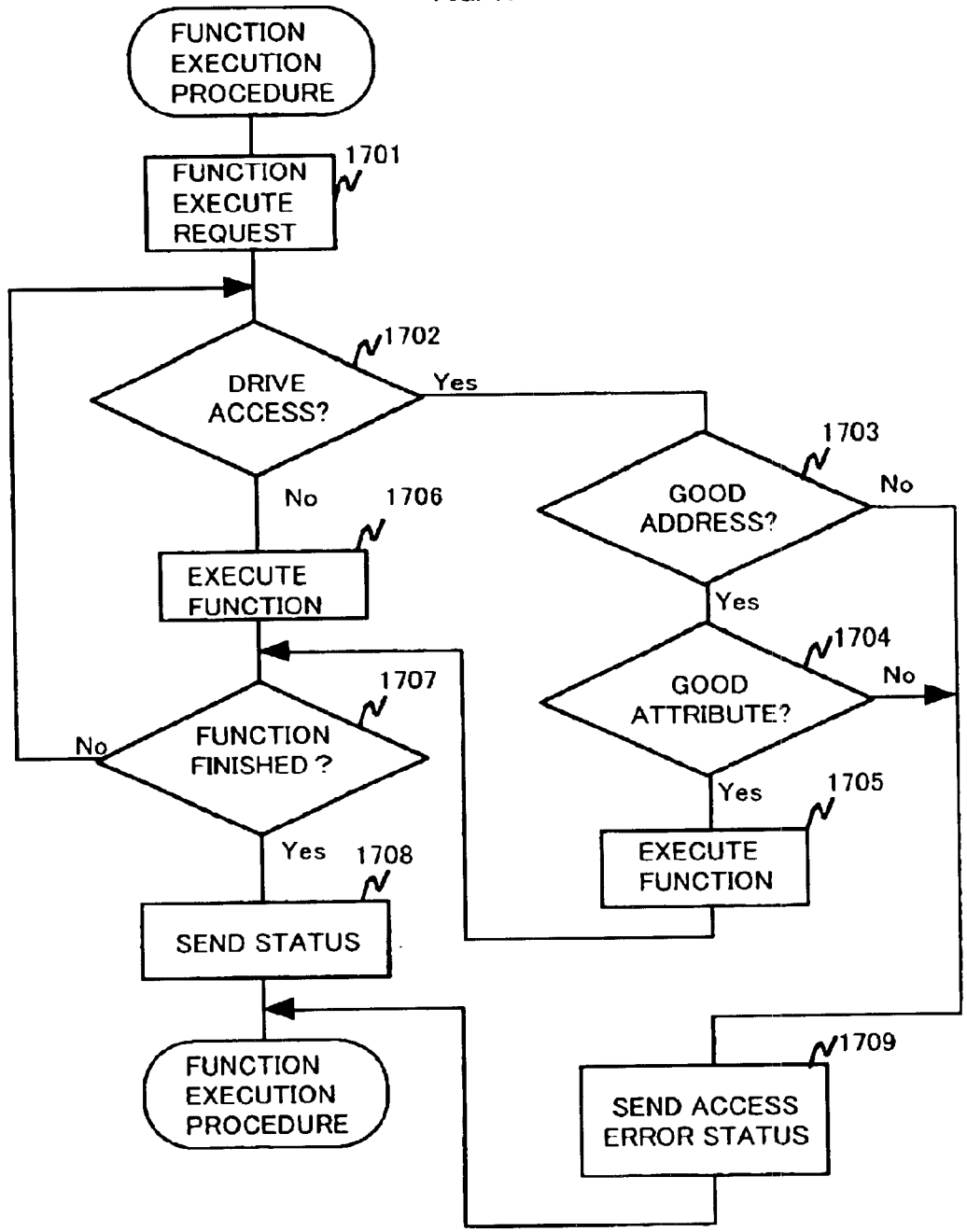
FIG. 17 is a flowchart indicating the function execute procedure for the function manager.

Operation of function manager 123 during function execution will be described using FIG. 17.

Function manager 123 receives a function execute request from function server 113, and along with the execute request, receives (1701) parameters necessary during execution and access area list 124. The accessible area, area size and attributes have been stored in access area list 124. After the information sent from function server 113 is registered into function information 126 and access area list 124, said function is inserted into execution queue 403. The priority ranking is determined from the execution level of function information 126, and then the function is inserted into its queue. Function scheduler 125 of function manager 123 executes functions in order from the highest priority.

In the case where execution of the function is completed, execution is performed by the CPU for a fixed amount of time, or when waiting without using the CPU for something such as an I/O, the function being executed is removed from execution queue 403 and the function with the next highest level of priority is executed. A function executed by the CPU for a fixed amount of time is reinserted into the end of said priority rank of execution queue 403. As for a function that is waiting for an I/O or something else, after the wait state is released, the function is reinserted into execution queue 403. Functions are executed by this type of scheduling.

If an access (1702) to drive 118 occurs during function execution, function manager 123 examines (1703) whether the address of the access destination is within the area of access area list 124. If the access is for an area outside the access list, it is an error. Function manager 123 is notified (1709) of an unallowable area access error, and the procedure is finished. If within the access area, the type of access is examined (1704). If the accessed data attribute differs from the access contents, such as a write to an access area when it is read-only, in the same manner as before, function manager 123 is notified (1709) of an unallowable area access error, and the procedure is finished. If the access type is within the specified area, the processing is executed (1705).

The above process continues (1707) until function execution is complete. If the function is completed normally, function manager 123 sends (1708) a good function execution acknowledgment and the function execution results to server 113, and the procedure is completed.

Preferred Embodiment 2

The present preferred embodiment 2 will be described below with reference to the drawings.

Figure 18:
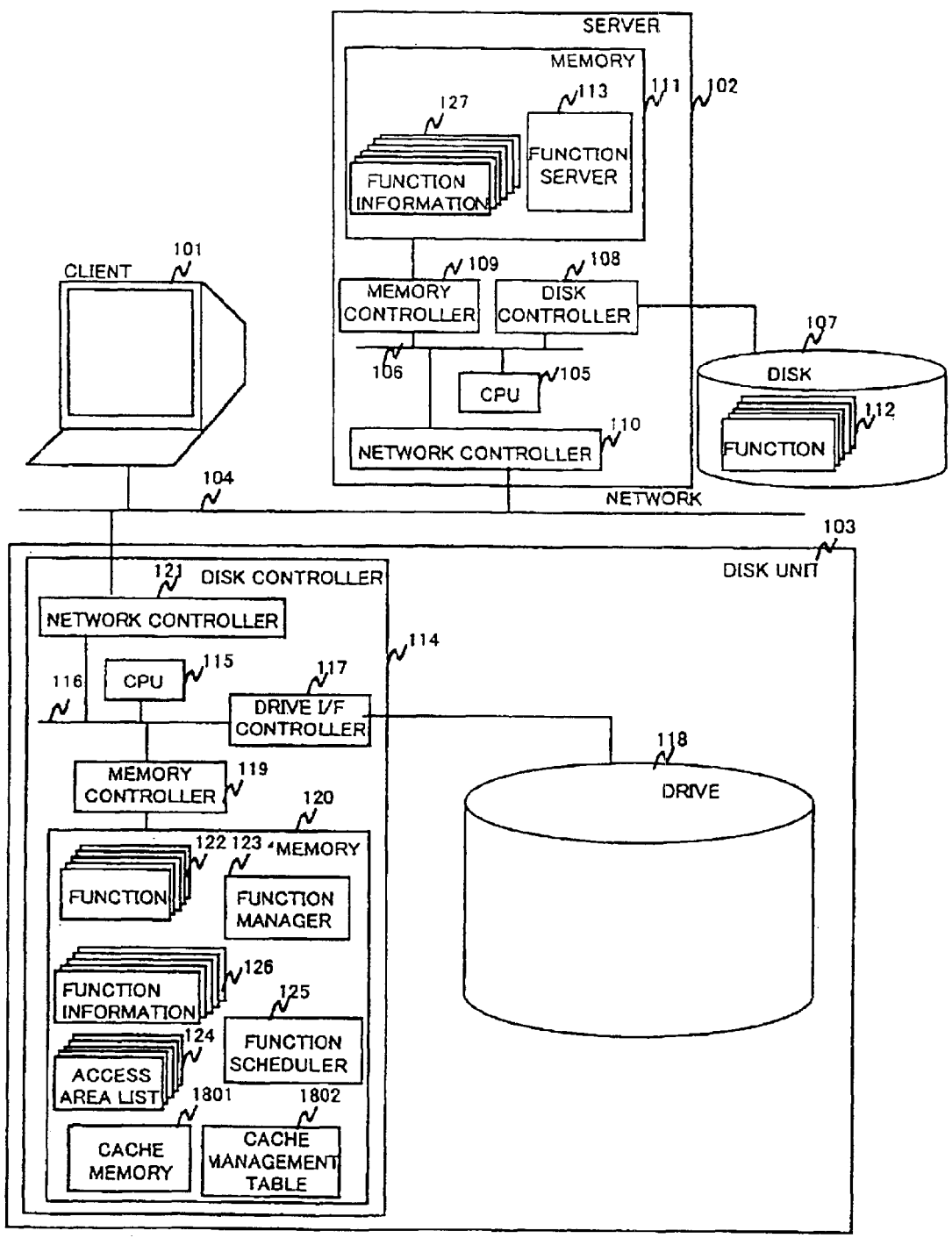
FIG. 18 is a block diagram illustrating the overall configuration of preferred embodiment 2 of the present invention.

A feature of the present embodiment is that, if an error occurs during function execution, it restores the state prior to execution of the function (rollback), without leaving any trace of the function state that was in the midst of being updated. FIG. 18 is a diagram indicating one preferred embodiment of the computer system related to the present invention. In the present preferred embodiment, disk drive 118 is indicated as disk unit 103, however a sub-system constructed from a plurality of disk drives 118 can also be configured as disk drive 103. As indicated in FIG. 18, client 101, server 102 and disk unit 103 are interconnected by network 104 in the present preferred embodiment. In the present preferred embodiment, server 102 is provided separately, but, realization of the present preferred embodiment is also possible with client 102 or disk unit 103 having the same functions as server 102 described in the present preferred embodiment.

Server 102 contains CPU 105 to execute the program. CPU 105 is connected to memory 111 via internal bus 106 and memory controller 109. The program to be executed by CPU 105 and the data necessary during execution are stored in memory 111. In the present preferred embodiment, function information 127 and function server 113 are stored in memory 111 and functions 112 are stored in disk unit 107. Except for during execution, functions 112, function server 113 and function information 127 are stored in disk unit 107. As necessary, CPU 105 issues commands to disk controller 108 that is connected to internal bus 106, extracts them from disk unit 107 and uses them. Function information 127 retains control information related to each function 112. In the present preferred embodiment, data to be written to disk unit 107 and data read from disk unit 107 are stored in memory 111. Server 102 is connected to network 104 via network controller 110. CPU 105 controls network controller 110 via the internal bus.

Disk unit 103 contains CPU 115 to perform processing. Drive I/F controller 117 reads the program to be executed by CPU 115 and the data used by the program from drive 118 and stores them in memory 120, according to the CPU command. Function manager 123, function scheduler 125, the functions, access area list 124, cache memory 1801, and cache management table 1802 are stored in memory 120.

Memory controller 119 is connected to CPU 115 via internal bus 116 and controls accesses from CPU 115 to memory 120. Function manager 123, function scheduler 125, functions 122, access area list 124 and function information 126 are stored in memory 120. Function information 126 retains information related to functions 122 and information of access area list 124 that restricts the access area of functions 122. The data of disk unit 103 is stored in drive 118. Drive 118 is controlled by drive I/F controller 117 that is connected to the CPU via the internal bus. By CPU 115 command, drive I/F controller 117 stores the data to be exchanged with drive 118 in memory 120.

Disk unit 103 is connected to client 101 and server 102 with network 104. Network 104 is controlled by network controller 121 with CPU 115 command. The data to be exchanged via network 104 is stored in memory 120.

Figure 19:
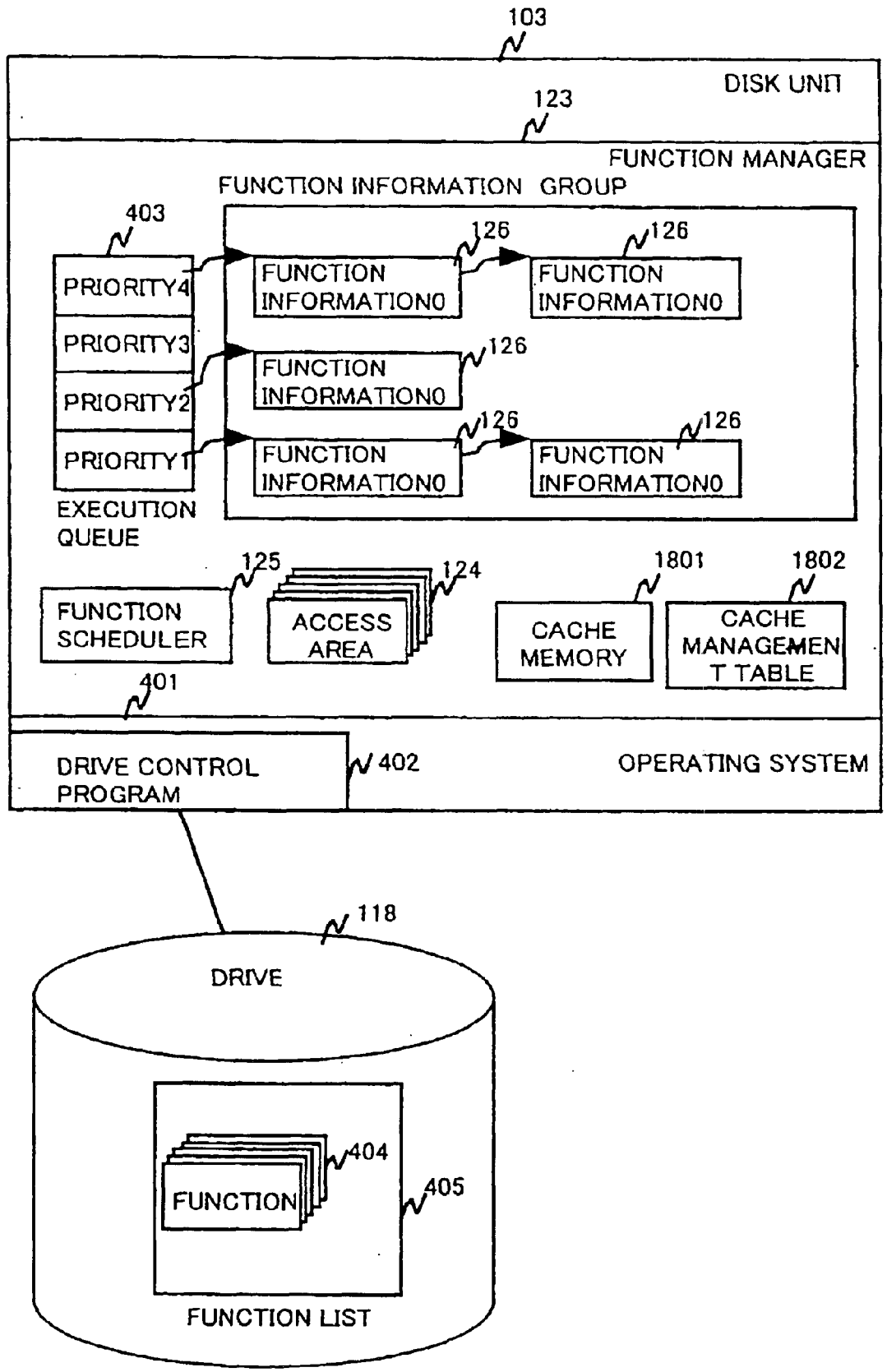
FIG. 19 is a block diagram illustrating the disk unit configuration.

FIG. 19 indicates one preferred embodiment of the program configuration for disk unit 103 related to the present preferred embodiment.

Disk unit 103 controls drive 118 with drive control program 402 within operating system 401. Functions sent from server 102 are stored in drive 118, and are read into memory 120 as necessary. Function manager 123 is configured on operating system 401. Function manager 123 contains function scheduler 125 that schedules functions during execution. Function scheduler 125 manages each function with execution queue 403. Execution queue 403 executes each function according to the priority ranking of the functions.

In the present preferred embodiment, functions connected to priority 1 have the highest priority ranking, and the priority ranking decreases in order of priority 2, 3 and 4. Functions to be executed are linked to execution queue 403 and queues of the same priority are linked by a list. The group of function information 00, 01, 02, 03, 04 126 is management information for functions 122, and is called function information 126. Each function information 126 retains an access area list 124 indicating the accessible area.

In addition, cache memory 1801 and cache management table 1802 are configured in function manager 123 to manage access data for drive 118 and it enables function rollback for drive 118. In the present preferred embodiment, cache memory 1801 is configured in memory 120. But, if the amount of update data becomes large, it may not all fit in memory 120, and therefore a cache memory can also be provided in drive 118 for update data. Function server 113 and function information 127 of function server 113 are the same as for preferred embodiment 1.

FIG. 20 indicates one preferred embodiment of function information 126 related to the present preferred embodiment. Function information 126 is comprised of: management number ID 601; name 602; pointer 603 that indicates the location; function version information 606; rollback flag 2001 that indicates the function rollback command; size 604 that indicates the size of the function; function execution level 605; and access area list information that indicates a pointer 608, size 609 and number 610 of the access file during function execution. Access area list 124 is the same as for preferred embodiment 1. The function send procedure is performed in the same manner as for preferred embodiment 1.

<Function Execution>

Figure 21:
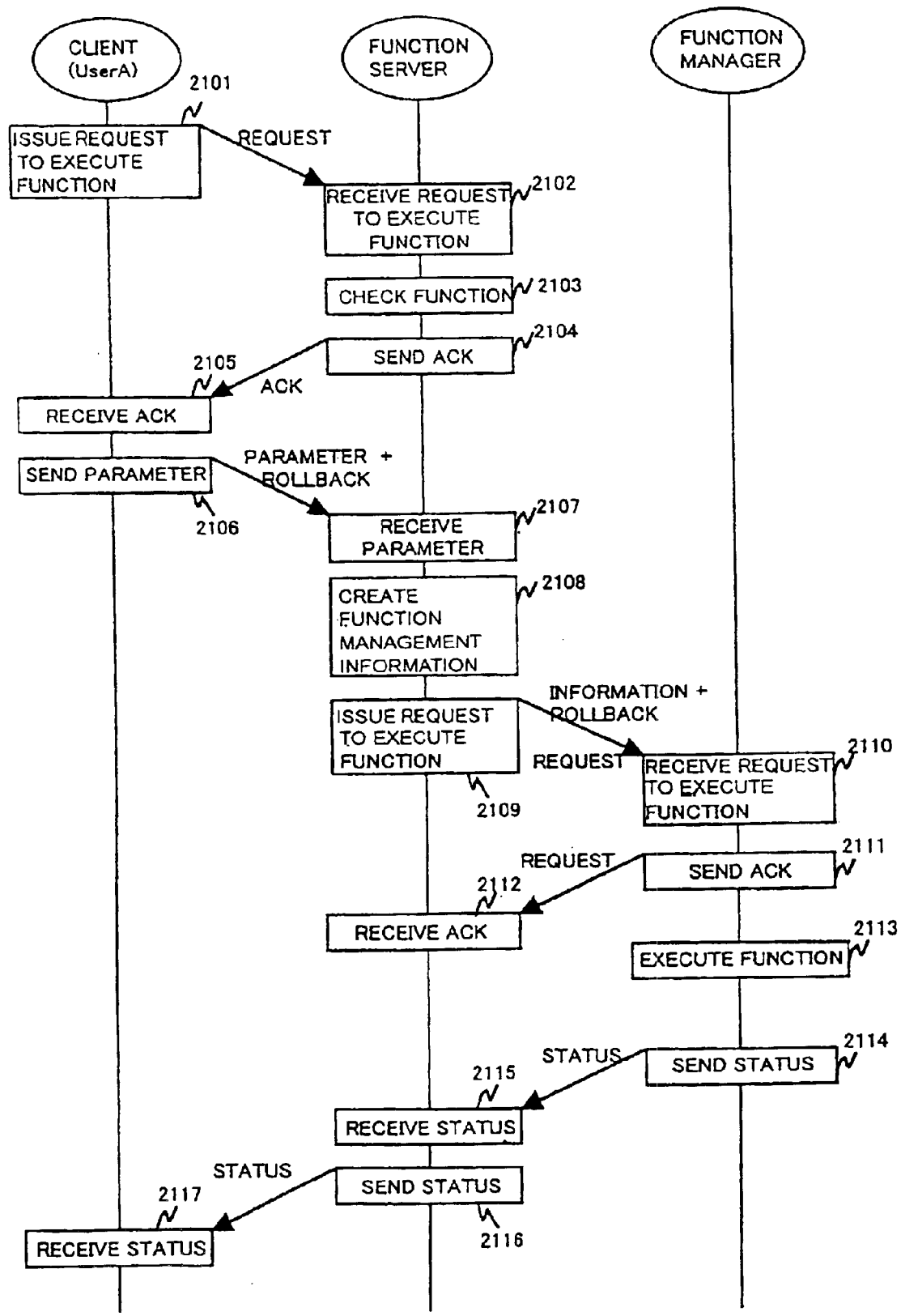
FIG. 21 is an operational flow diagram indicating the overall flow of the function execute procedure during normal processing.

Next, the flow of a function execute request will be described using FIG. 21.

When a user of client 101 executes a certain function, at first, a function execute request is sent (2101) to function server 113. Along with the function execute request, disk unit 103 that will execute the function and the user are informed. Here, disk unit 103 has been chosen to execute the file. However, since disk unit 103 can be determined at once from a file of file system 202 on server 102, implementation is also possible by specifying a file of file system 202 on server 102.

After issuing the function execution request, client 101 receives (2105) a function receive acknowledgment from function server 113. If the acknowledgment contents indicate that the function is non-executable, because the function is non-executable, error processing is performed and the procedure is finished. If the function is executable, then parameters necessary during function execution are sent (2106). Here, the parameters are the file and directory to be used, the data necessary during function execution and the rollback command. This differs from preferred embodiment 1 in that the rollback command is included in the parameters. In the case that a rollback command is not issued, even if an error occurs during the function, the data that was in the midst of being processed will remain unchanged in the state during the function execution. In the case that a rollback command is issued, if an error occurs during the function, the data will be restored to its state prior to function execution.

After the parameters are sent, the parameter receive results are received. In case of an error, error processing is performed and the procedure is finished. If there is no error, the procedure continues. The client waits for function execution completion. Client 101 receives (2117) the function complete acknowledgment and the function execution results. In the case of erroneous completion, error processing is performed, the user is notified that an error occurred and the procedure is finished. If the execution process was performed normally, the user is notified of the normal processing and of the function execution results, and the procedure is finished. Since the description of function execution for the function server and the function manager is the same as for FIG. 14, a repeat of the designation has been omitted.

Figure 22:
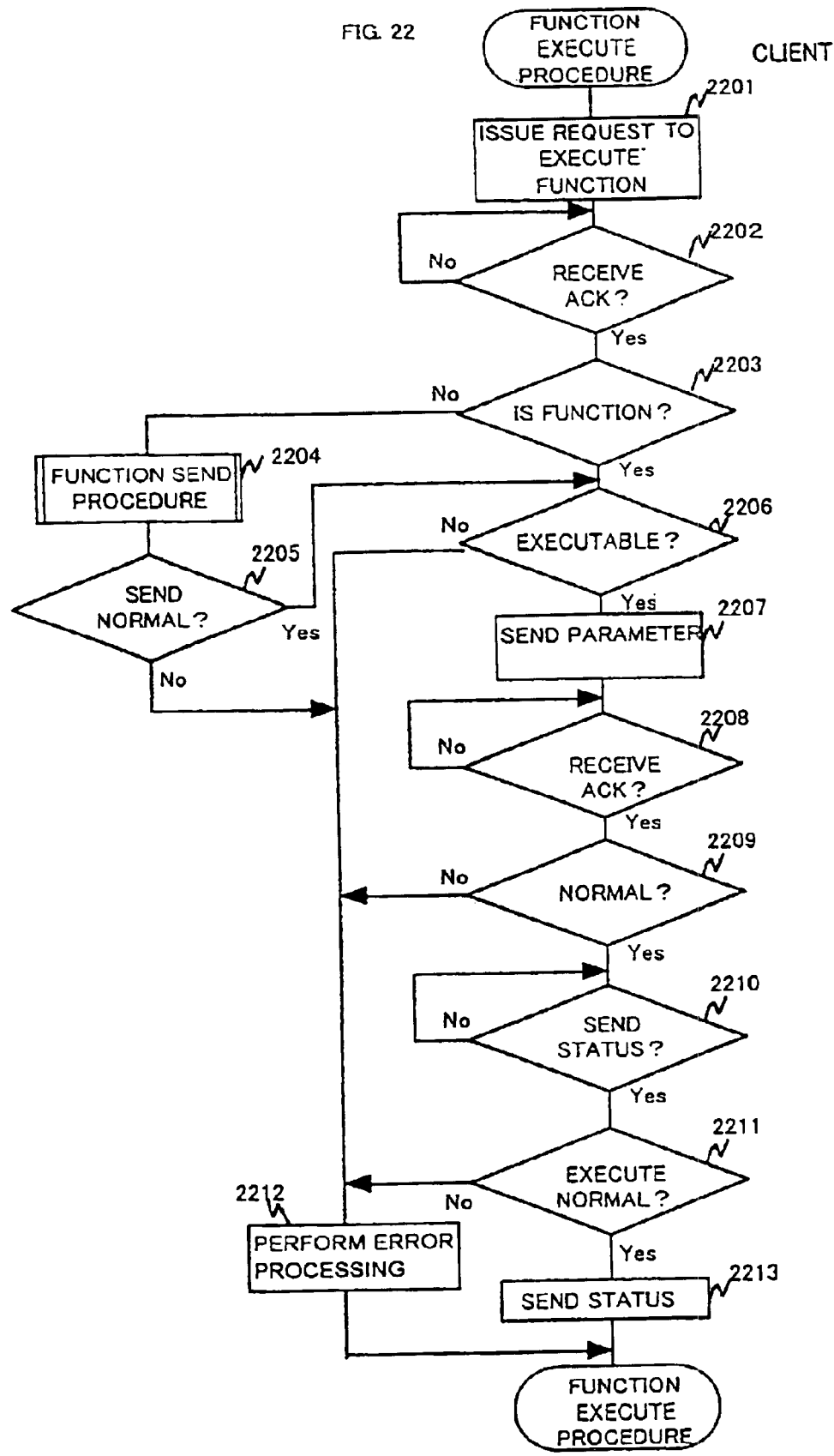
FIG. 22 is a flowchart indicating the function execute procedure for the client.

Next, the flow of a function execute request will be described using FIG. 22.

When a user of client 101 executes a certain function, at first, a function execute request is sent (2201) to function server 113. Along with the function execute request, disk unit 103 that will execute the function and the user are informed. Here, disk unit 103 has been chosen to execute the file. However, since disk unit 103 can be determined at once from a file of file system 202 on server 102, implementation is also possible by specifying a file of file system 202 on server 102.

After issuing the function execution request, client 101 receives (2202) a function receive acknowledgment from function server 113. If the function has not been registered in the server, a function send is performed (2204). If the send is performed normally, the procedure continues. If an error occurs, an error notice is issued and the procedure is finished (2212).

Next, if the acknowledgment contents indicate (2206) that the function is non-executable, because the function is non-executable, error processing is performed (2212) and the procedure is finished. If the function is executable, then parameters necessary during function execution are sent (2207). Here, the parameters are the file and directory to be used, the data necessary during function execution and the rollback command.

After the parameters are sent, the parameter receive results are received (2208). In case of an error, error processing is performed and the procedure is finished. If there is no error, the procedure continues. The client waits (2210) for function execution completion. Client 101 receives (2209) the function complete acknowledgment and the function execution results. In the case of erroneous completion, error processing is performed (2212), the user is notified that an error occurred and the procedure is finished. If the execution process was performed normally, the user is notified (2213) of the normal processing and of the function execution results, and the procedure is finished.

Figure 23:
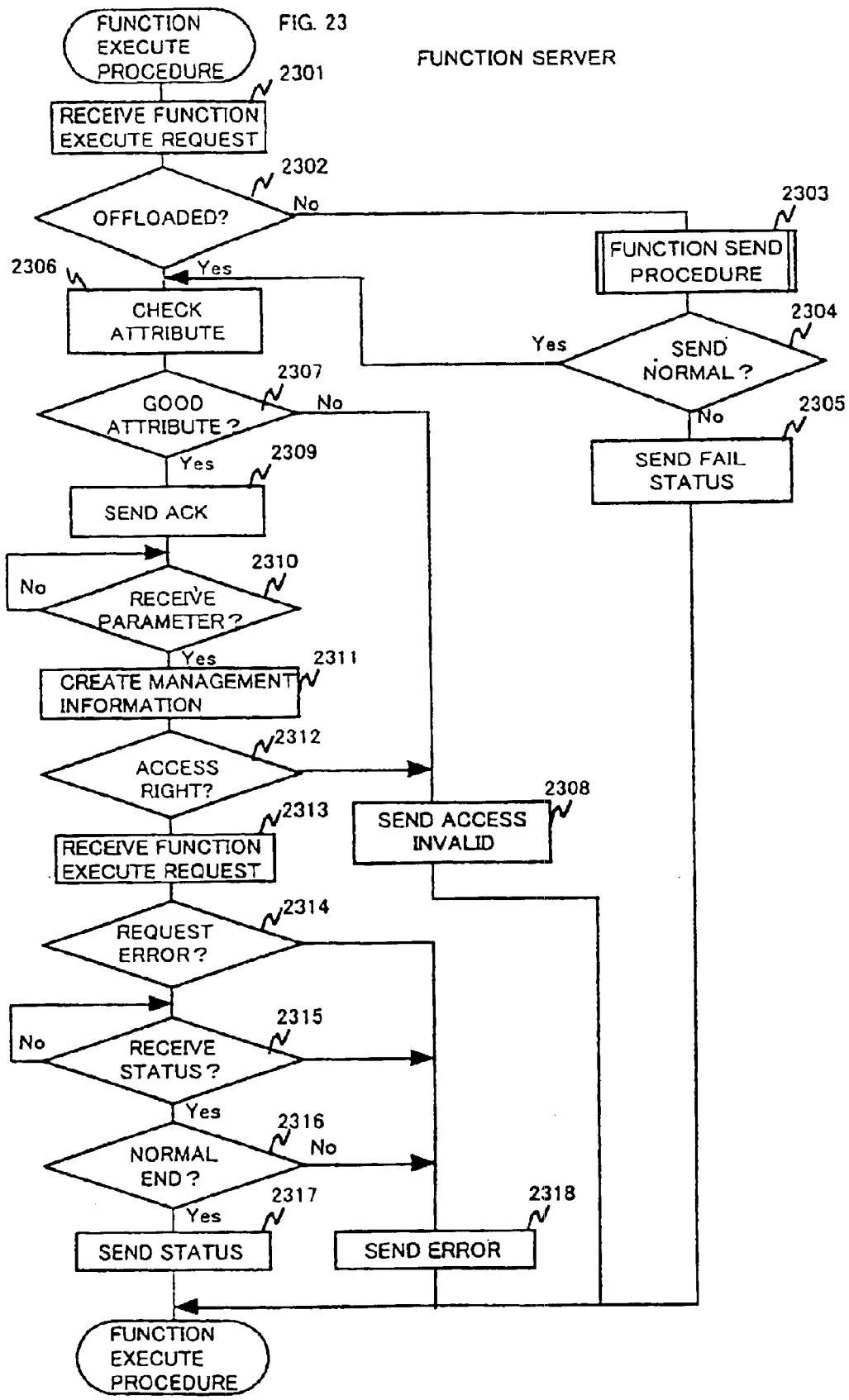
FIG. 23 is a flowchart indicating the function execute procedure for the function server.

Next, the procedure during function execution of function server 113 will be described using FIG. 23.

At first, function server 113 receives (2301) a function execute request from client 101. At this time, along with the request, client 101 specifies disk unit 103 that executes the function and the user that originated the request. Function server 113 searches function list 204 for the requested function. If the requested function is not in function list 204, or if after examining function information 127, said function has not been sent (2302) to said disk unit 103, the function in client 101 is sent (2303) to function manager 123 via function server 113. If the function send is completed normally, the procedure continues. If the function could not be sent (2304) normally, client 101 is notified (2305) that the function send has failed, and the procedure is finished.

When the function has been sent to disk unit 103, function information 126 of said function is extracted from function list 204, and is checked (2306) as to see whether the user making the request for said function has the function execution right. If the user has (2307) no function execution right, client 101 is informed (2308) that the user has no execution right, and the procedure is finished. If the user has (2307) the function execution right, client 101 is informed (2309) that the function is executable.

Next, parameters necessary during function execution including the rollback command are received (2310) from client 101. Parameters related to the access area are added to the access object of function information 127. Then, conversion of the access object is performed. Obtaining the physical address of a file or directory from file system 202 and operating system 201 on server 102, the access object gains the physical location of the file and creates access area list 124. At this time, whether the user who originated the request has the access right to the specified file and directory is checked (2312). If there is no access right, client 101 is notified (2308) of a process error and the procedure is finished. If access is possible for all access objects, the procedure continues.

Next, along with the function execution request, function server 113 sends (2313) parameters other than the access area, but including the rollback command and access area list 124, to function manager 123. If the receive acknowledgment (2314) of the function execute request has an error, client 101 is notified (2318) of the error and the procedure is finished. If there is no error, the function server waits (2315) for a function execution complete acknowledgment.

After function execution is completed, and after function server 113 receives a function complete report from function manager 123, the contents of the report are examined (2316). If there is an error, client 101 is notified (2318) of the error and the procedure is finished. If the report is normal (2316), a good completion acknowledgment and the function execution results are sent (2317) to client 101 and the procedure is completed. If the function has not been sent to function manager 123 as indicated above, then prior to the function execution request for function manager 123, a function send procedure is performed according to the sequence of function send procedures.

The function execute procedure will be described for the case when the function already has been sent to the function manager. Operation of function manager 123 during function execution will be described using FIG. 24.

At first, function manager 123 receives a function execute request from function server 113, and along with the execute request, receives (2401) parameters necessary during execution, the rollback command and access area list 124. The accessible area, area size and attributes are stored in access area list 124. After the information sent from function server 113 is registered into function information 126 and access area list 124, said function is inserted into execution queue 403. The scheduling of execution queue 403 is performed in the same manner as that of preferred embodiment 1.

Figure 24:
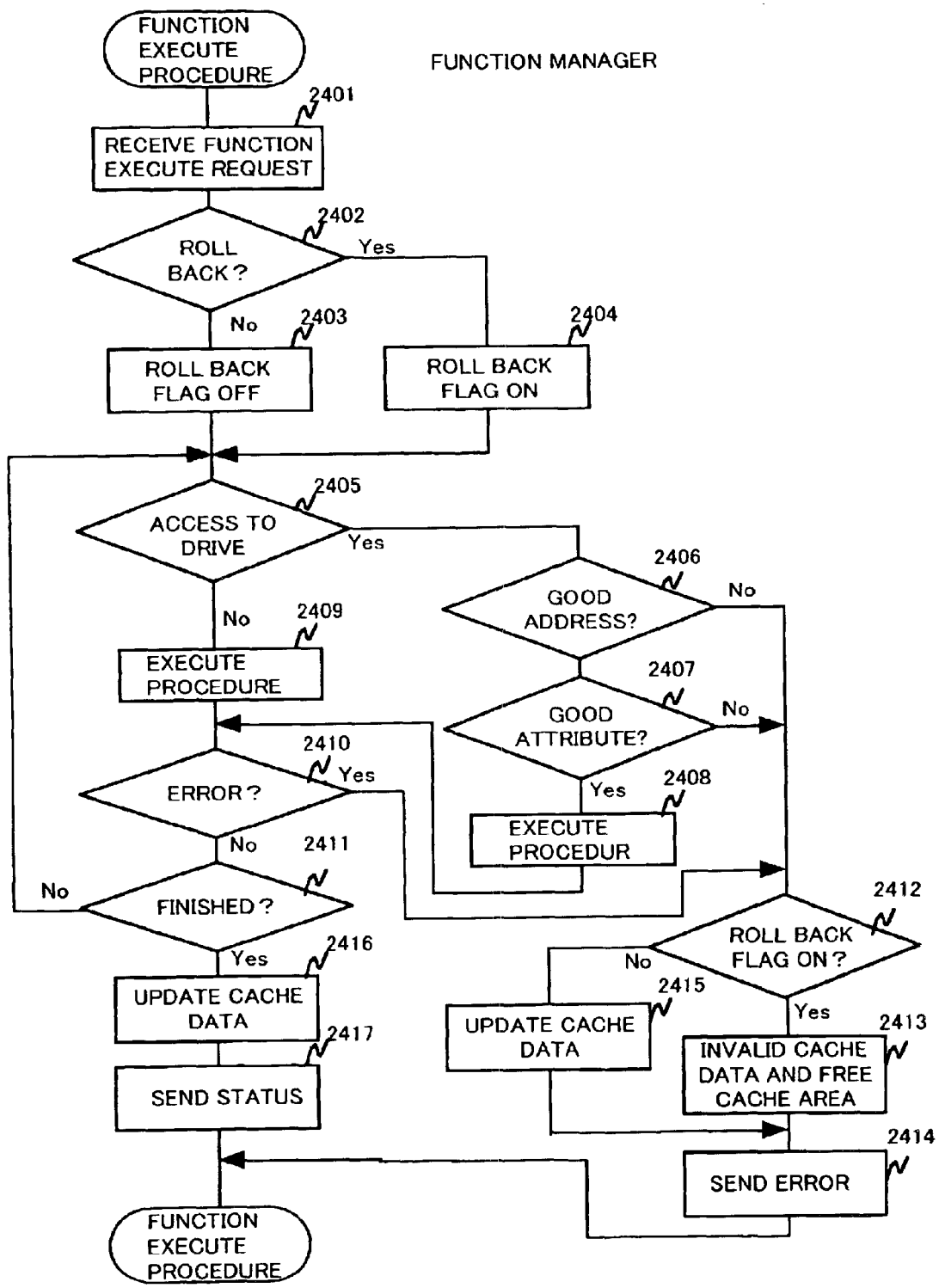
FIG. 24 is a flowchart indicating the function execute procedure for the function manager.

The procedure after insertion into execution queue 403 will be described using FIG. 24. First, the existence of a rollback command is checked (2402). If there is a rollback command, the rollback flag is set to ON (2404). If there is no rollback command, the rollback flag is set to OFF (2403). Next, if there is no access to drive 118 during execution of the procedure, the execution is performed as is. If there is access to drive 118, similar to preferred embodiment 1, a check of the access area and a check of the access type are performed (2406, 2407). If there is an error during said check, the rollback procedure is performed.

The rollback procedure is performed as follows. When the rollback flag is ON (2412), after deleting (2413) the non-updated data in cache memory 1801, function manager 123 is notified (2414) of an error. When the rollback flag is OFF, after writing (2415) the updated data in cache memory 1801 to drive 118, function manager 123 is notified (2414) of an error. If the access check is normal, the procedure is executed (2408). If an error occurs as a result of procedure execution, the aforementioned rollback procedure is performed. When function execution is completed normally, non-updated data in cache memory 1801 are written to drive 118 and a good completion acknowledgment is sent to function manager 123.

Figure 25:
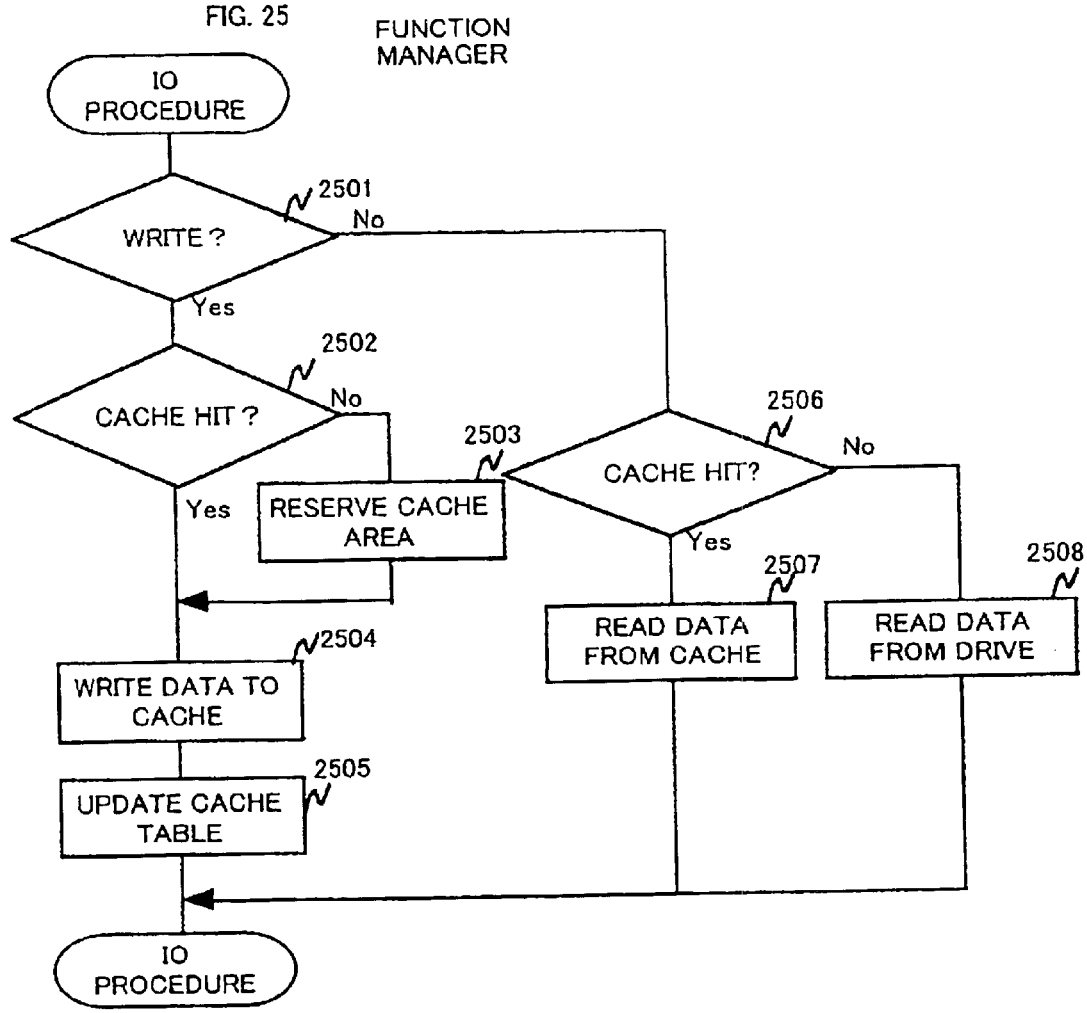
FIG. 25 is a flowchart indicating the I/O processing for a drive in the function manager.

Next, the I/O procedure for drive 118 during function execution will be described using FIG. 25. This procedure is executed in the case of an access to drive 18 during function execution.

Function manager 123, at first, checks (2501) the type of procedure for drive 18. In the case of a write access, if there is data in cache memory 1801, the old data is overwritten with new updated data. If there is no data in cache memory 1801, a new area is reserved in cache memory 1801, and data is stored in the reserved area (2502, 2503, 2504). If the cache memory 1801 contents are updated during a write access, cache management table 1802 is updated (2505). In case that the type of access to drive 118 is a read access, if data exists in cache memory 1801, the data in cache memory 1801 is read (2507) and the procedure continues. If data does not exist in cache memory 1801, the data in drive 118 is read (2508) and the procedure continues.

Figure 26:
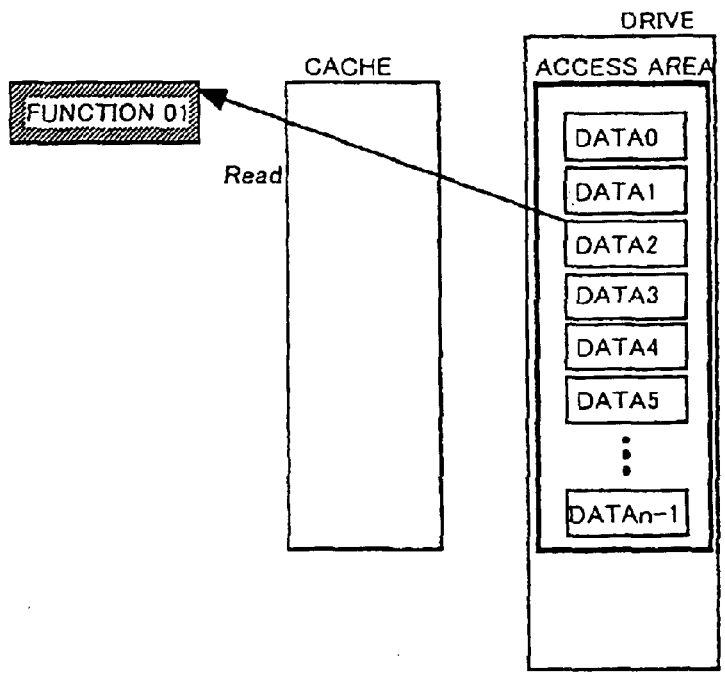
FIG. 26 is a diagram indicating a read from the drive.
Figure 27:
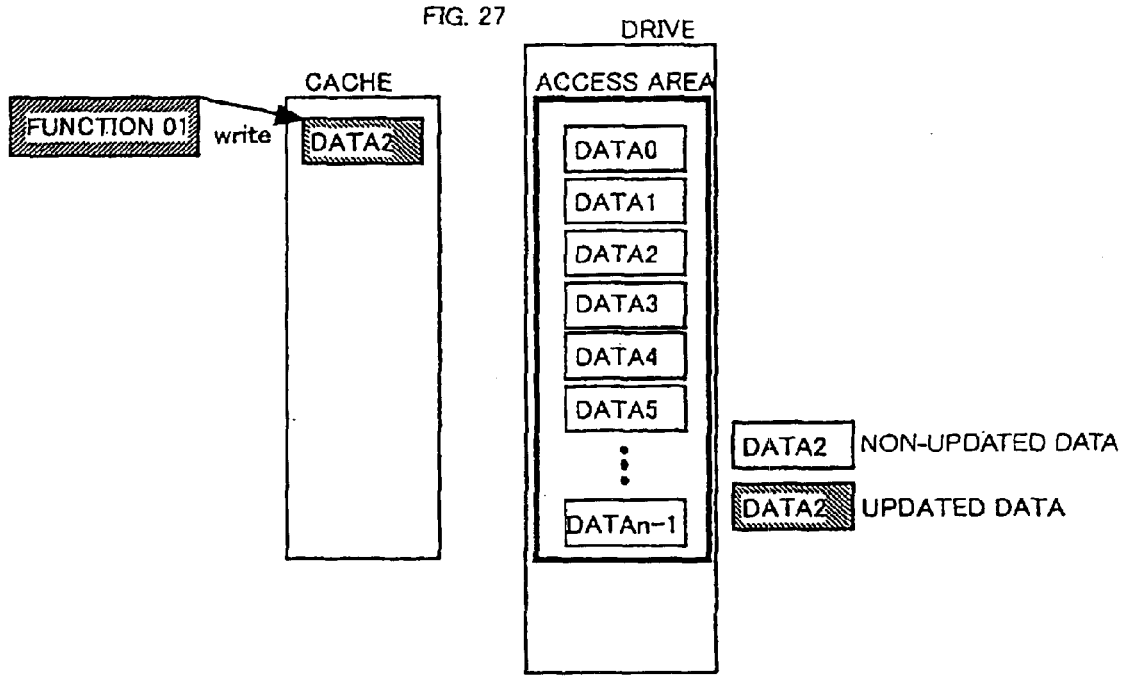
FIG. 27 is a diagram indicating a write to the cache.
Figure 28:
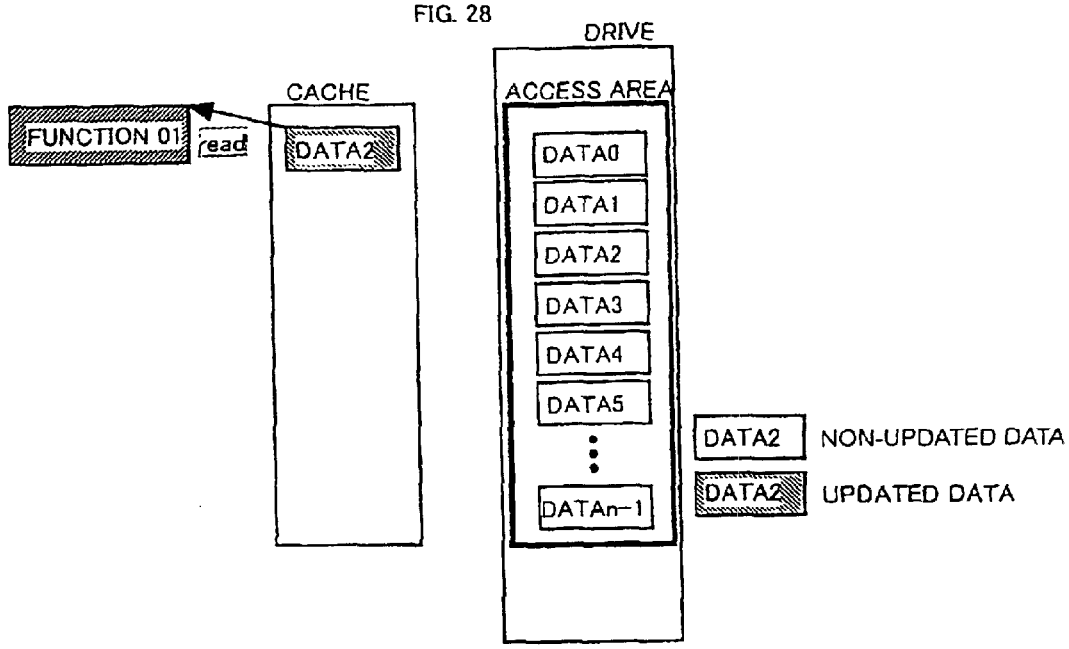
FIG. 28 is a diagram indicating a read from the cache.
Figure 29:
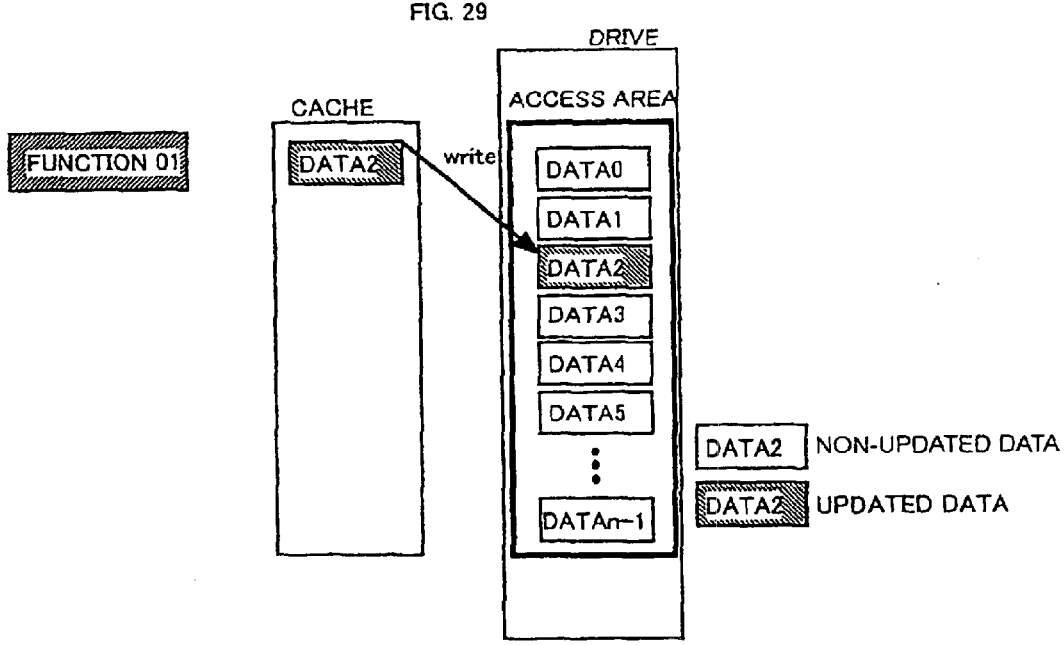
FIG. 29 is a diagram indicating a write to the drive.

FIG. 26 indicates a read from the drive, FIG. 27 indicates a write to the cache, FIG. 28 indicates a read from the cache, and FIG. 29 indicates a write to the drive.

With the present invention, data access restriction can be effectively performed for data access during function execution in the disk unit. Further, the restriction of data access can be performed in the same manner for various types of operating systems. Restriction information can also be easily installed.

What is claimed is:

1. A disk unit, connectable to a server computer and a client computer via a network, wherein the server computer manages a plurality of function programs that the client computer requests to execute and manages data stored in the disk unit, the disk unit comprising:

disk storage media for storing data; and a control unit which includes a memory for storing the function programs and function information relating to some of the plurality of function programs, wherein said control unit receives one of the function programs from the server computer and stores the received function program into the memory, wherein said control unit receives a function execution request from the server computer, requesting execution of one of the function programs, from the server computer, selects the requested function program from the memory, selects the function information in connection with the selected function program, and executes the selected function program according to a condition described in the selected function information, wherein the function execution request is sent from the client computer to the server computer to request execution of one of the function programs, and wherein said control unit examines, based on the selected function information, whether an access from external of said disk unit to the data stored in said disk storage media is allowable and restricts accesses to the data stored in the disk storage media from external of said disk unit during execution of the selected function program.

2. A disk unit according to claim 1, wherein:

the selected function program is a selection or extraction process in a database.

3. A disk unit according to claim 1, wherein:

execution of the selected function program includes a direct data transfer between the client and the disk unit without passing through the server.

4. A disk unit according to claim 1, wherein:

the selected function information comprises a list that indicates an accessible area, and wherein said control unit examines whether access to the data is allowable based on the list.

5. A disk unit according to claim 4, wherein:

the list comprises attributes indicating at least one of read, write and executable, related to access restriction during execution of the selected function program.

6. A disk unit according to claim 4, wherein:

said control unit abnormally terminates execution of the selected function program in case that an access occurs in violation of the access examination.

7. A disk unit according to claim 1, wherein:

said control unit monitors whether execution of the selected function program was performed successfully and restores data stored in said disk storage media to its state prior to execution of said-the selected function program in case that execution of the selected function program was not successful.

8. A disk unit according to claim 7, wherein:

said control unit does not overwrite non-updated data with data updated from the selected function program execution, until the execution of the selected function program is complete.

9. A disk unit according to claim 8, wherein:

said control unit stores data updated from said selected function program execution in the memory.

10. A disk unit according to claim 1, wherein:

said control unit monitors whether execution of the selected function program was performed successfully, sets in the function information a user command that specifies whether to restore data stored in said disk storage media to its state prior to execution of the selected function program in case that execution of the selected function program was not successful and restores data stored in said disk storage media to its state prior to execution of the function only in case where a command has been set in the function information to restore data stored in said disk storage media to its state prior to execution of the selected function program in case that execution of the selected function program was not successful.

11. A disk unit according to claim 8, wherein:

a control unit does not overwrite non-updated data with data updated from the selected function program execution, until the execution of the selected function program is complete.

12. A method of controlling a disk unit connectable to a server computer and a client computer via a network, wherein the disk unit has disk storage media for storing data, and a control unit, and wherein the server computer manages a function program that the client computer requests to execute and manages data stored in the disk unit, the method comprising the steps of:

receiving, in said disk unit, a function program and function information relating to execution of the function program from the server computer;

executing, in said disk unit, the function program in response to a function execution request from the client computer as per the function information; and examining, in said disk unit, based on the function information, accesses from external of said disk unit to the data stored in said disk storage media and restricting the accesses during execution of the function program.

13. A method of controlling a disk unit according to claim 12, wherein:

the function program is a selection or extraction process in a database.

14. A method of controlling a disk unit according to claim 12, wherein:

the function program is a direct data transfer between the client and disk units without passing through the server.

15. A method of controlling a disk unit according to claim 12, wherein:

the function information comprises a list that indicates an accessible area, and wherein said control unit examines accesses for the data based on the list.

16. A client/server system comprising:

a client computer;

a server computer connected to the client computer; and a disk unit connected to the client computer and the server computer, the disk unit having disk storage media for storing data, and a control unit, wherein said client computer requests execution of a function program by said server computer, wherein said server computer creates function information relating to execution of the function program that has been requested from said client computer, and wherein said disk unit receives the function program and the function information from the server computer, executes the function program as per the function information and examines, based on the function information, accesses from external of said disk unit to the data stored in said disk storage media and restricts the accesses during execution of the function program.

* * * * *